United States Patent
Cartwright et al.

(10) Patent No.: US 9,445,053 B2
(45) Date of Patent: Sep. 13, 2016

(54) LAYERED MIXING FOR SOUND FIELD CONFERENCING SYSTEM

(71) Applicants: Dolby Laboratories Licensing Corporation, San Francisco, CA (US); Dolby International AB, Amsterdam Zuidoost (NL)

(72) Inventors: Richard J Cartwright, Killara (AU); Craig Johnston, Sydney (AU); Glenn N Dickins, Como (AU); Heiko Purnhagen, Sundyberg (SE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 373 days.

(21) Appl. No.: 14/166,065

(22) Filed: Jan. 28, 2014

(65) Prior Publication Data
US 2014/0240447 A1    Aug. 28, 2014

Related U.S. Application Data

(60) Provisional application No. 61/770,702, filed on Feb. 28, 2013.

(51) Int. Cl.
*H04N 7/14*     (2006.01)
*H04N 7/15*     (2006.01)
*G10L 19/008*   (2013.01)
(Continued)

(52) U.S. Cl.
CPC ............. *H04N 7/152* (2013.01); *H04M 3/569* (2013.01); *G10L 19/008* (2013.01); *G10L 25/78* (2013.01); *H04M 3/567* (2013.01)

(58) Field of Classification Search
CPC ........................................ H04N 7/14

USPC .................... 348/14.01, 14.09, 14.08, 14.12
See application file for complete search history.

(56) References Cited

U.S. PATENT DOCUMENTS 7,945,006 B2    5/2011   Chen
2003/0023428 A1   1/2003   Chang
(Continued)

FOREIGN PATENT DOCUMENTS

WO    2007/084254    7/2007

OTHER PUBLICATIONS

Haun, Michael et. al., "3DTel—A Spatial Audio Teleconferencing System", Nov. 2011.
(Continued)

*Primary Examiner* — Olisa Anwah

(57) ABSTRACT

A conferencing server (100) receives incoming bitstreams (I1, I2, I3, I4, I5) carrying media data from respective conferencing endpoints (110, 120, 130, 140, 150); receives a mixing strategy (M) specifying properties of at least one outgoing bitstream (O1, O2, O3, O4, O5) and requiring at least one additive media mixing step; and supplies at least one outgoing bitstream by executing, in a processor (103) and a memory (102) with a plurality of memory spaces, a run list of operations selected from a predefined collection of primitives and realizing the received mixing strategy. A pre-processor (104) in the server derives said run list repeatedly and dynamically while taking into consideration determined momentary activity in each incoming bitstream. In embodiments, the run list may be derived by (a) pruning of an initial run list, (b) constrained or non-constrained minimization of a cost function, or (c) automatic code generation.

20 Claims, 2 Drawing Sheets

(51) Int. Cl.
*H04M 3/56* (2006.01)
*G10L 25/78* (2013.01)

(56) References Cited

U.S. PATENT DOCUMENTS

| | | |
|---|---|---|
| 2006/0018451 A1 | 1/2006 | Usuba |
| 2008/0215681 A1 | 9/2008 | Darcle |
| 2010/0165889 A1 | 7/2010 | Madabhushi |
| 2010/0284311 A1 | 11/2010 | Moore |
| 2010/0305728 A1 | 12/2010 | Aiso |
| 2011/0038281 A1 | 2/2011 | Saleem |
| 2011/0317825 A1* | 12/2011 | Baird .................... H04M 3/568 379/202.01 |
| 2012/0039219 A1 | 2/2012 | Elwood |
| 2012/0069134 A1 | 3/2012 | Garcia |

OTHER PUBLICATIONS

Kheder, D., "Media Handling for Conferencing in Manets", A Thesis in the Department of Electrical and Computer Engineering (ECE), Montreal, Quebec, Canada, Nov. 2007.
Bohm, I., "Automatic Code Generation Using Dynamic Programming Techniques", University of Linz, Oct. 2007.
Aho, A. et. al., "Code Generation Using Tree Matching and Dynamic Programming", ACM Transactions on Programming Languages and Systems, vol. 11, Issue 4, New York, NY, Oct. 1989, pp. 491-516.
Fraser, C. et. al., "Engineering a Simple, Efficient Code-Generator Generator", ACM Letters on Programming Languages and Systems, vol. 1, Issue 3, New York, NY, Sep. 1992, pp. 213-226.
Fraser, C. et. al., "Finite-State Code Generation", Proceedings of the ACM SIGPLAN 1999 Conference on Programming Language Design and Implementation, vol. 34, Issue 5, New York, NY, May 1999, pp. 280-280.
Glanville, R. et. al., "A New Method for Compiler Code Generation", POPL '78 Proceedings of the 5th ACM SIGACT-SIGPLAN symposium on Principles of Programming Languages, New York, NY, 1978, pp. 231-254.
Horspool, R. N., "Automating the Selection of Code Templates", vol. 15, Issue 5, May 1985 pp. 503-514.
Proebsting, T., "Simple and Efficient BURS Table Generation", PLDI '92 Proceedings of the ACM SIGPLAN 1992 Conference on Programming language Design and Implementation, vol. 27, Issue 7, New York, NY, Jul. 1992, pp. 331-340.
Proebsting, T., "BURS Automata Generation", ACM Transaction on Programming Languages and Systems (TOPLAS), vol. 17, Issue 3, New York, NY, May 1995, pp. 461-486.
Proebsting, T., "One-pass, Optimal Tree Parsing—With or Without Trees", Proceedings of the 6th International Conference on Compiler Construction, vol. 1060, 1996, pp. 294-306.

* cited by examiner

LAYERED MIXING FOR SOUND FIELD CONFERENCING SYSTEM

CROSS-REFERENCE TO RELATED APPLICATIONS

This application is related to U.S. provisional application No. 61/770,702, filed on Feb. 28, 2013, which is incorporated herein by reference in its entirety.

TECHNICAL FIELD

The invention disclosed herein generally relates to multi-party electric communication technique, including tele- and video-conferencing. In particular, the invention relates to a method for efficient mixing of media data in real time, as well as a conferencing server configured to perform the method.

BACKGROUND

Tele- and videoconferencing servers enabling a spatial meeting experience have been the subject of a number of the applicant's previous patent applications and other disclosures. Efficiency and high scalability in such conferencing servers can be achieved for instance by their ability to forward data with minimal processing, so that a given mixing strategy—a desired composition of the output signals—can be realized at small computational cost and the resulting signals can be distributed with moderate bandwidth. The sense of a continuous and plausible audio scene is achieved with only a few simultaneous outgoing audio streams (possibly combined with output video or other media data) sent to any endpoint for rendering. Further, if "mixing" is seen as an operation that creates a specific signal or concatenation of data that arises from multiple input data sources, then the required amount of actual mixing—adding signals or channels together as opposed to simply forwarding—can be significantly reduced by using a family of layered spatial audio formats across the conferencing system.

It is desirable to allow each endpoint to decide on its preferred input and output layered audio formats, possibly during operation as well, to account for network jitter, packet loss rate and similar temporary variations. It is further desirable to concentrate server resources to participants deemed to be playing a prominent role in the conference (e.g., by mixing their data at an improved fidelity compared to participants interjecting into the discussion) and to avoid processing audio streams that currently do not carry any meaningful information, such as background noise rather than speech by a participant. These two facts together give rise to a considerable number of possible mixing configurations, depending on:

- the spread of rendering capabilities of the endpoints and choices made by users of the endpoints, which influences the number of unique output signals;
- the variations in available momentary bandwidth between the server and the endpoints, which influences the set of suitable output formats;
- the spread of different input signal formats, which influences the amount of format conversions required in connection with mixing; and
- the number of simultaneously active input signals, which determines both the nature of the mixing and—if server-mediated side tone is being avoided (i.e., the server avoids echoing each client's own media stream back to that client)—the number of unique output signals.

More precisely, in existing conferencing systems of this type, a sending endpoint may elect to send layers up to its full capability. It may at some times, either locally or as directed by a central server or other system component, send a reduced set of layers and/or a signal with a reduced degree of continuity. In general, such a reduction of upstream transmission of the capture would be associated with an endpoint not being particularly active or important in a given conference. Furthermore, the server may accept a large set of incoming streams with different sets of layers. Generally, there will be more information in the incoming layers (in terms of functional and spatial layers) than the server would combine or forward on to other output endpoints. Therefore, it is a general design aim that the server can manage this varying set of input layers from a set of devices, as well as the varying mixing strategy and actions required to strip, combine, mix and/or forward the media streams represented in the layered format. Generally, the output format for a given endpoint will be set by the device capability or user selection (e.g., use of headphones or speakers). The media data are sent out to each endpoint in some format which may range from the forwarded component media streams through to the actual device audio signals, with associated metadata, such that the endpoint can reconstruct the desired audio scene. In this way, at any point in time, the count and format of the layered audio media streams sent to the output client can change dynamically and is decided by the server against some criteria that may be imposed by any given endpoint.

In this setting, each mixing configuration—the combination of the number and formats of the input signals and the number and formats of the output signals—may be realized by a series of operations including unpacking and packing of media data (e.g., converting between transport formats and internal formats), operations on data values (e.g., applying gain/equalizing, adding signals together, removing reverb, gating, adding comfort noise, applying virtualization based on head-related transfer functions), conversions between different layered formats, different specific standard or proprietary coding formats, memory management etc. Different implementations of a same mixing configuration may differ in performance, which the programmer may improve by trying to explicitly and predictively locate and eliminate redundant instructions, reusing intermediate results, evaluating different orderings of the operations and changing the point of operation between the server and client or other networked computational resource (e.g., a slave server which mixes streams on behalf of the master server). As an example, the task of inputting several signals in different input formats A and B, and outputting a mix of these in an output format C can be achieved by each of the following tactics: conversion into C followed by C-mixing; conversion into B followed by B-mixing followed by conversion into C; conversion into A followed by A-mixing followed by conversion into C; separate A-mixing and B-mixing followed by conversion of one of the partial mixes into B followed by B-mixing of the partial mixes followed by conversion into C, etc. While performance can typically be measured or predicted for a concrete implementation (e.g., by a clock cycle count), it is not clear from the outset which tactic will be the most promising one and it may be a tedious task to explore all important candidates. Additionally, where there are many simultaneous users and endpoints participating in a related conference, the re-use of these intermediate format, manipulations, sub-mixes and conversions can be optimized across a large set of desired output mixes.

A routine approach to the problem outlined above has been to consider each mixing configuration separately and have one or more programmers implement it 'as optimally' as the circumstances permit, after which the result is stored as computer-readable code ready for execution by the conferencing server. Such code will generally be written to include a large set of tests and conditional branches which are constructed to achieve the desired outcome with some sense of efficiency, ordering and scalability. The conferencing server may sense the number and formats of the active input signals and respond by determining a relevant code portion (or script), loading the code portion from memory and executing this in a media-enabled processor. In a rule-based conferencing server of this type, the steps of sensing, determining and loading can typically be made very fast, so that it matches the sudden speaker changes typical of a human conversation. As already noted, however, the number of mixing configurations to implement may be very large, which has a direct impact on the costs in the design phase or a later re-design phase unless some mixing configurations are dropped. For instance, if the designer accepts deviations from the desirable aim of not processing silent (or inactive) input signals, it may be sufficient to implement only the relatively more versatile mixing configurations and omit more specialized ones. For instance, a routine implementing a mixing configuration with four inputs can be utilized for mixing three active signals if the routine is additionally fed with a fourth signal, either the signal having been deemed inactive or a dummy signal with placeholder values.

As the number of potential formats and mixing possibilities increases, there is a geometric increase in the number of potential routes that could be followed. Whilst there is often a limited number of high-impact optimizations, as the complexity grows with formats and mixing strategies, code to reliably find and optimize the underlying operations becomes difficult to manage, and validate. When such systems develop iteratively, additional code to achieve a desired optimization can have unexpected, undesirable impact on another aspect or operating condition. In the context of this invention, at the point where multiple layered formats covering spatial and functional audio properties combined with a desire for novel and dynamic mixing strategies, the system was no longer feasible to manage as static conditional code.

Rather than repeating the trade-off between the conflicting requirements outlined above, it would be an attractive option to approach the real-time mixing problem encountered in conferencing servers from a different direction. This is a purpose of the present invention.

BRIEF DESCRIPTION OF THE DRAWINGS

Example embodiments of the invention will now be described with reference to the accompanying drawings, on which.

All the figures are schematic and generally only show parts which are necessary in order to elucidate the invention, whereas other parts may be omitted or merely suggested. Unless otherwise indicated, like reference numerals refer to like elements in different figures.

DETAILED DESCRIPTION OF EXAMPLE EMBODIMENTS

1. Overview

Figure 1:
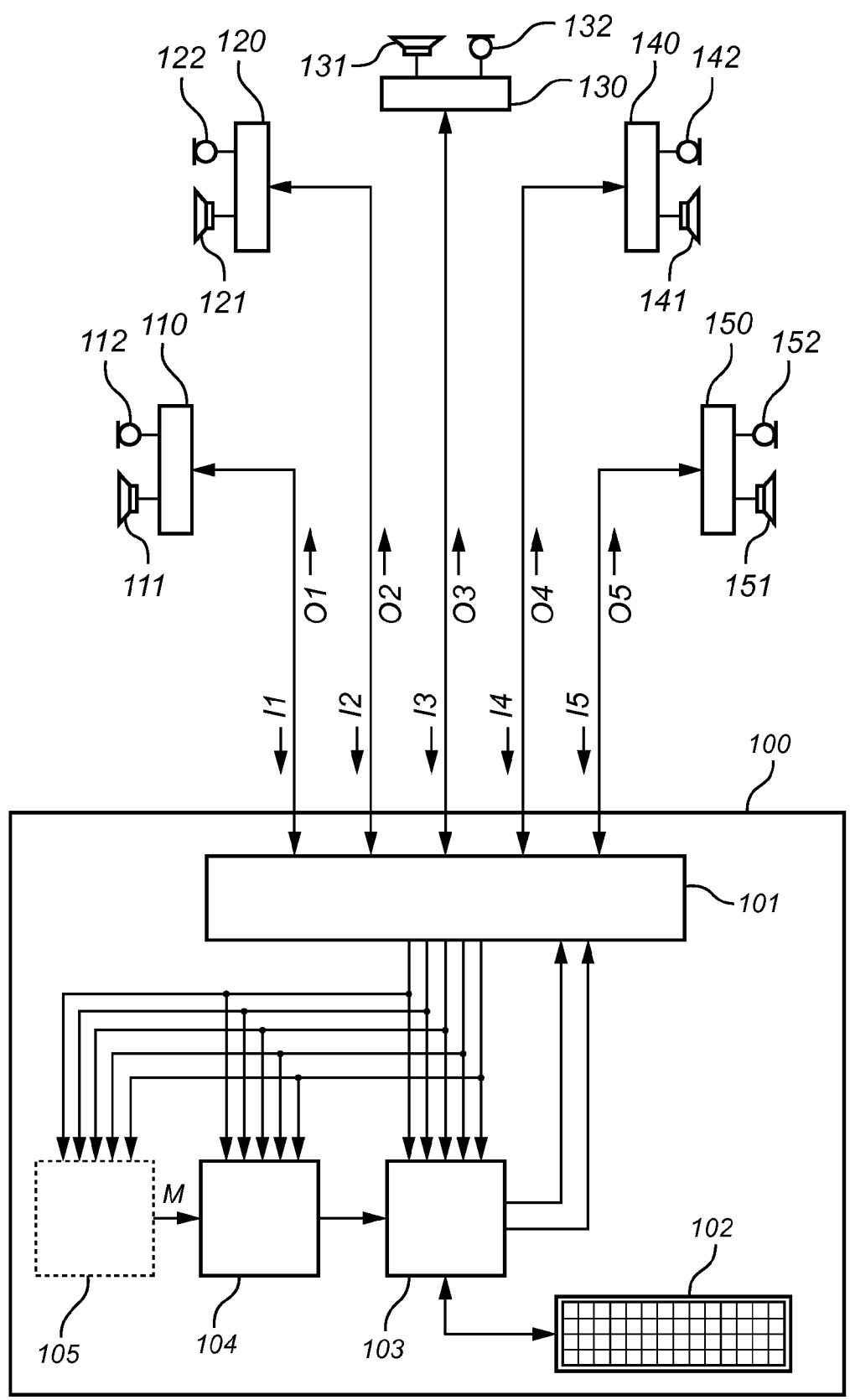
FIG. 1 is a generalized block diagram of a conferencing system, in which a conferencing server communicating with a plurality of conferencing endpoints over a network, according to an example embodiment.

As used in this disclosure,
a mixing strategy may relate to information specifying the desired properties of at least one outgoing bitstream from the conferencing server in relation to the incoming bitstreams. On the one hand, the mixing strategy may specify the desired content of each outgoing bitstream, e.g., by defining how the outgoing bitstream can be obtained by composing (or mixing) incoming bitstreams, possibly with different degrees of fidelity depending on their roles in the conference. On the other hand, the mixing strategy may contain a 'hard' condition on the desired type of the outgoing bitstream(s) (e.g., a specific sound field format) or a 'soft' condition relating to its perceptual properties (e.g., any spatial format, which can then be realized by discrete channel-wise encoding, by a sound field format with jointly coded channels, or a multi-channel format utilizing parametric upmixing to achieve a spatial experience). A mixing strategy may be conditional upon the activity of the incoming bitstreams, e.g., by stipulating that all active incoming bitstreams are to be mixed or substantially preserved, without knowing which they are;
a mixing configuration may be the realization of a mixing strategy in a case where the incoming bitstreams are known as to their number and/or format and/or activity and possible further factors that the mixing strategy may depend on. For example, in a system with n connected conferencing endpoints, a mixing strategy stipulating that all active incoming bitstreams are to be mixed and fed to all endpoints may at a given point in time, where m<n bitstreams are active, map to a mixing configuration where m active bitstreams are mixed together and supplied to all n endpoints;
media data includes audio data, video data, audiovisual data and screen-sharing data. Audio data, which may be contained in a pure audio signal or in the audio part of a video or audiovisual signal, may include one or more independent channels. Audio data may be combined with metadata (including functional and/or spatial layers), such as upmix parameters, rendering gain and the like, as described in the provisional U.S. application No. 61/703,857; and
a bitstream comprises data in a transport format, in particular a packetized format suitable for transmission over a packet-switched communication network, which may carry media data. The conversion to and from the transport format may be referred to as packing and unpacking data. Data unpacked from a bitstream may be in encoded or unencoded format depending on how the bitstream was prepared; in particular, encoding may include lossy or lossless data compression.

A conferencing server may include a communication interface, a memory and a processor. Via the interface, the conferencing server is adapted to receive incoming bitstreams from a plurality of conferencing endpoints and to supply one or more outgoing bitstreams to the conferencing endpoints. The bitstreams include media data. The processor is responsible for supplying the outgoing bitstream(s) on the basis of the incoming bitstreams and does so by performing operations (or instructions or atoms) from a predefined collection of primitives. The collection of primitives, which may be a finite enumeration of operations or may be defined in terms of abstract properties, is limited to operations that either input media data from one or more of said memory spaces (or registers) and/or output media data to one or more of said memory spaces.

The conferencing server preferably operates in real time. This is to say, the server has sufficient computing power at its disposal to meet a (perceptually motivated) upper bound on the processing delay, typically of the order of 0.1 second or less; this for instance requires the server to be able to process an incoming bitstream packet as it comes in, without significant buffering time.

According to an example embodiment, the conferencing server further comprises a pre-processor, which is configured to repeatedly derive run list based on a mixing strategy and by dynamically taking into consideration momentary activity in each incoming bitstream. The run list consists of operations from the collection of primitives that would realize the received mixing strategy. The derivation of the run list is repeated, either at fixed time intervals or by an event-triggered mechanism, so that the run list is maintained up-to-date and tuned to current operating conditions prevailing in the conferencing server. The run list may comprise several output programs, and it may then be advantageous to repeat the derivation of only a subset of the output programs, to with, those that are affected by a triggering event. The derivation is dynamic in the sense that a change in momentary activity in the incoming bitstreams will directly influence the conditions on which the derivation of the run list is based, in accordance with any of the example embodiments to be described in what follows (including pruning a posteriori, iterative optimization and optimal path planning), so that a run list with a different appearance or structure may result. The run list thus derived ("derived" taken to include also the process of obtaining a run list by pruning a non-optimized initial run list and/or compiling the non-optimized initial run list into a run list, as is the case when the pre-processor acts as compiler) can be supplied to the processor, which executes the operations contained therein with the arguments specified, so that one or more outgoing bitstreams are eventually obtained and transmitted to the endpoints.

The above example embodiment, whether implemented as a conferencing server or a method performing the functions of the server, uses automatic code generation to solve the problem of implementing the potential mixing configurations required in a conferencing server. This approach avoids the conflict between design cost and operative efficiency that was discussed in the Background section. It also allows for easy reconfiguration, such as a modification of the mixing strategy both dynamically and potentially structurally over a longer design cycle. Since the operations set out provide a powerful and canonical set of primitives that could implement a wide variety of mixing strategies both known and potentially developed, it is noted that the present invention has a substantial advantage of allowing continual improvement of the nature and optimization of mixing strategies without requiring large rework on the critical real time systems of the server. In a way, this is analogous to the design where a computational device can run many potential programs not yet designed without additional design of the operational engine.

As will be set out in this disclosure, the present invention provides a means of structuring a design where the cost of performing the explicit specification of each mixing strategy at the detailed level along with one or more stages of optimization does not exceed the benefits and reduction in complexity resulting from the optimizations achieved. The examples presented provide evidence of this in even very simple cases, and this naturally extends in a beneficial way for larger conferences.

The origin of the mixing strategy is not essential to this invention: the mixing strategy may have been defined manually or automatically during the design or manufacturing phase and retrieved from a memory while the conferencing server is operating; alternatively, the mixing strategy may be supplied from an external party (e.g., a system administrator or a participant) via a message, a transferable data file or the like; further alternatively, the mixing strategy may vary over time in response to momentary and/or historic activity at each conferencing endpoint, so as to follow the specific behaviours of the participants and/or automatically give appropriate priority to a chairperson or moderator, and may be prepared by a mixing selector. In a conferencing server, the mixing strategy typically (e.g., in the absence of inactive incoming media data signals) can only be realized by performing at least one step of mixing media data additively. Indeed, in order for one participant to experience the media data from multiple other participants, there must be a process of mixing within the system, and for large scalable systems of the sort discussed in this disclosure, this is generally managed and executed effectively by some central server.

It is also not essential to this invention how the momentary activity in each incoming bitstream is determined or how it is measured. This functionality may be integrated in a processing resource at the point of capture and the outcome may be either embedded explicitly or indicated implicitly by a decision not to transmit. Alternatively, the momentary activity may be determined by the pre-processor within the server, or delegated to the interface, the processor and/or a separate activity detectors—in particular a voice activity detector—which forwards this information to the pre-processor for use in the derivation of the run list. As noted, the media data may relate to audio data, and activity in a audio signal may for example be measured as energy content in relevant frequency bands. In a video signal, activity is suggested in particular by participant presence (as evidenced, e.g., by analysis of pixel colour distribution or shape recognition) or by moving visual objects in the scene or is triggered simultaneously by activity in some other modality, such as audio.

In an example embodiment, the media data relate to audio data, and momentary audio activity in the incoming bitstreams is updated at least every second in order to keep up with changing conditions in the conference mediated by the conferencing system. Every update will provide a new set of momentary audio activity values for the incoming bitstreams, which thus changes one of the conditions underlying the derivation of the run list. As such, because this may potentially lead to a different appearance of the run list, the run list is re-derived for each update of the momentary audio activity. Preferably, the momentary audio activity is updated even more frequently, e.g., on average at 10 Hz or 25 Hz or 50 Hz or more. In variations to this embodiment, the update of the momentary audio activity is event-triggered, e.g., by a rise, decrease, fluctuation, failure or other predefined behaviour in one of the incoming bitstreams.

In an example embodiment, each run list is derived by running an optimization process which tends to minimize a cost function and which outputs a run list of operations from said collection or primitives. The cost function can be defined to meet the needs in each particular use case. The cost function however includes at least one contribution that penalizes a deviation from the received mixing strategy, e.g., omitting a desired component in an outgoing bitstream, or supplying an outgoing bitstream in a layered format inferior to the desired one. Preferably, the penalty on not achieving the received mixing strategy is relatively stronger than penalties on, say, use of processor resources or memory space, so that the optimization process will in normal conditions return a run list that achieves the received mixing strategy completely, or at least stays perceptually close to the received mixing strategy. One option is to express the received mixing strategy as a constraint (or absolute condition) in the definition of the optimization process, so that—unless the optimization process fails—the run list derived will always achieve the received mixing strategy, whereas the cost for doing this may fluctuate. Alternatively, the optimization process is subject to at least one constraint on processor use, memory use, bandwidth use or the like, but not to any constraint relating to the mixing strategy; instead, the received mixing strategy is encouraged by a penalty included in the cost function. To satisfy such constraints on the resources used, the optimization process may sometimes return a run list causing the processor to achieve an inferior version, or best-effort version, of the received mixing strategy.

Independently of the cost function or any constraints defined, the optimization process may be iterative, wherein each iteration improves a previous run list candidate in a manner achieving a decrease (or at least non-increase) of the cost function value, thereby tending to minimize the cost function. It is no essential element of this invention to iterate the optimization until absolute optimality or optimality within machine epsilon is reached. As an initial value to the iterative optimization process, one may use list of potential operations that achieves a specific output, such as a low-performing dummy run list that achieves the mixing strategy.

As an alternative to iterative algorithms, the optimization process may be structured as a solver for path-planning problems or dynamic programming problems. This removes the need for supplying an initial value to the optimization process, which instead uses as input the count and formats of the active incoming bitstreams on the one hand (start of the sought-for path) and the mixing strategy on the other (goal of the sought-for path), and attempts to connect these by an optimal or near-optimal chain of operations selected from the collection or primitives.

Examples of the primitives which the processor is configured to execute will be given below. In the particular case where the conferencing server supports a family of layered audio formats, the primitives may include conversions between layered audio formats in the family. Furthermore, the primitives may include at least one operation on data values (e.g., applying gain, adding signals together) that are represented in accordance with the layered formats in the family. As described in full detail in the provisional U.S. application No. 61/703,857, a family of layered audio formats may include sound field audio data and associated metadata, in particular sound field audio data prepared by Karhunen-Loève transformation and associated metadata representing a frequency-dependent gain profile to be applied at rendering and spatial parameters guiding upmix-related operations executed during rendering. The primitives may then further include an operation for changing the gain metadata and/or an operation for changing a geometric property of the sound field, such as changing the perceived stereo width, moving a main audio source and secondary sources, rotating the sound field, panning, pinching etc. By handling audio data representations if this type, the conferencing server enables a spatial conferencing experience while staying scalable and efficient from a computational point of view.

In an example embodiment, the pre-processor is configured with the ability to derive a run list which is not to be executed by the processor only but contains at least one delegated operation to be performed in a conferencing endpoint or in a networked computational resource. To achieve this, the delegated operation is communicated, preferably together with media data and preferably within one of the outgoing bitstreams, to a networked resource or an endpoint with processing capabilities. The endpoint performs the delegated operation on the received media data before it proceeds to (rendering and) playing the media data to the user. It is mainly envisaged that an endpoint performs such delegated operation for its own benefit, that is, acting on media data that are to be rendered at the same endpoint. Without departing from the scope of the present invention, however, a work-sharing arrangement between a plurality of conferencing endpoints would be equally possible, wherein one conferencing endpoint transmits media data resulting from the performing of the delegated operation in the run list to surrounding or remote conferencing endpoints in the conferencing system. In a further development, the server could even instruct the endpoints that are sending media data to the server to instead send the media data directly to the endpoint or server actually doing the processing. All of these possible implementations relieve the conferencing server of a portion of its computational tasks and distributes the tasks over the network; this reduces the necessary investment in server hardware and further improves the conferencing system's resilience to temporary failures.

A further example embodiment proposes an alternative or supplement to the optimization approach discussed above. In this approach, the conferencing server receives the mixing strategy in the form of an initial run list (the result of which may for practical purposes be regarded as the mixing strategy), and the pre-processor prunes the initial run list in accordance with the detected momentary activity in the incoming bitstreams. In particular, the pre-processor may operate in response to negative activity detected and remove portions of code in the initial run list which need not be executed to achieve the same end result as the initial run list or portions of code that are redundant for other reasons. For instance, when the run list is to provide a number of similar or identical outgoing bitstreams, a straightforward implementation would tend to duplicate the same operations; by drawing on intermediate results, this redundancy can be eliminated. In addition to deletion of code portions, the pruning may include adapting operations in the run list, reordering operations and modifying the arguments to the operations. The pruning may be limited to such changes that do not affect the end result, that is, the content or the format of the outgoing bitstreams supplied by the processor when executing the run list. In typical implementations, the initial run list and the run list are represented in the same executable language, such as compilable source code, compiled object code, or interpretable byte code, virtual machine code or script instructions. Optimization in this context can refer to one or more passes of optimization that may operate locally or globally in order to partition and effectively manage optimization complexity and potential optimizations achieved.

In example embodiments, the mixing server is configured to process bitstreams belonging to more than one simultaneous conference. This is to say, the conferencing server supports several ongoing meetings, which are fully or partially disjoint from one another. The operations in the server relating to one ongoing conference need not be performed separately from those of the other conferences, which would otherwise restrict the benefit of possible parallelization, efficient scheduling, memory use and the like. The fact that the endpoints belong to different conferences at a given point in time may however be reflected in the mixing strategy received. For instance, the mixing strategy may stipulate that all active incoming bitstreams in the same conference are to be mixed and returned to the endpoints participating in that conference.

Example embodiments may relate both to a conferencing server and a method performed therein, or a data carrier with instructions for causing a programmable computer to perform the method in the conferencing server, that is, to act as conferencing server.

In a further aspect, there is provided a conferencing endpoint capable of performing a delegated operation communicated to the endpoint together with media data from a conferencing server. To this end, the conferencing endpoint may include an interface for receiving a bitstream from the conferencing server and a media rendering means configured to render media data contained in the bitstream. In an example embodiment, the conferencing endpoint additionally comprises a processor arranged in a processing path between the interface and the media rendering means. The processor is configured to extracted a delegated operation from the bitstream, which operation acts upon the media data. The processor executes the delegated operation prior to rendering the media data, so that the media data may have a different appearance than when it was received by the interface.

It is also envisaged to provide a slave server, which is arranged in the network and offloads processing tasks from the centrally located conferencing server and/or the conferencing endpoints. The processing tasks may be delegated to the slave server by a decision by the conferencing server. The slave server may have a structure similar to the conferencing endpoint capable of performing a delegated operation, but need not comprise any media output/input means, such as microphones or loudspeakers. The slave server and the endpoint with processing abilities may share the conferencing server's set of primitives and operations, or an extended version thereof, to facilitate the partitioning and execution of such delegated operations. This creates a further code convenience.

It is finally noted that the invention relates to all combinations of features, even if these are recited in mutually different claims.

2. Example Embodiments

2.1 System

FIG. 1 shows a conferencing system including a conferencing server 100 communicating with a plurality of conferencing endpoints 110, 120, 130, 140, 150 by way of incoming bitstreams I1, I2, I3, I4, I5 received from the endpoints and outgoing bitstreams O1, O2, O3, O4, O5 despatched to the endpoints. One or more of the outgoing bitstreams may be copies of one another. The communication between the conferencing server 100 and the conferencing endpoints 110, 120, 130, 140, 150 has been schematically drawn as direct connection lines. It is noted that no permanent or direct connection between the server 100 and any of its endpoints is required, but the bitstreams may as well be exchanged over a switched network, such as a PSTN, a star-shaped network or over a packet-switched digital network, such as an Ethernet-type local area network or the Internet.

Each conferencing endpoint 110, 120, 130, 140, 150 includes media rendering means 111, 121, 131, 141, 151, for rendering media data encoded in the bitstreams I1, I2, I3, I4, I5 that are received from the conferencing server 100, and media capturing means 112, 122, 132, 142, 152, for capturing metadata to be encoded despatched in the bitstreams O1, O2, O3, O4, O5 incoming to the server 100. In a typical use case, each of the conferencing endpoints 110, 120, 130, 140, 150 is operated by one or more conference participants in a location separate from those of the other participants, allowing these to interact in the framework of one or more conferences without meeting physically.

Figure 2:
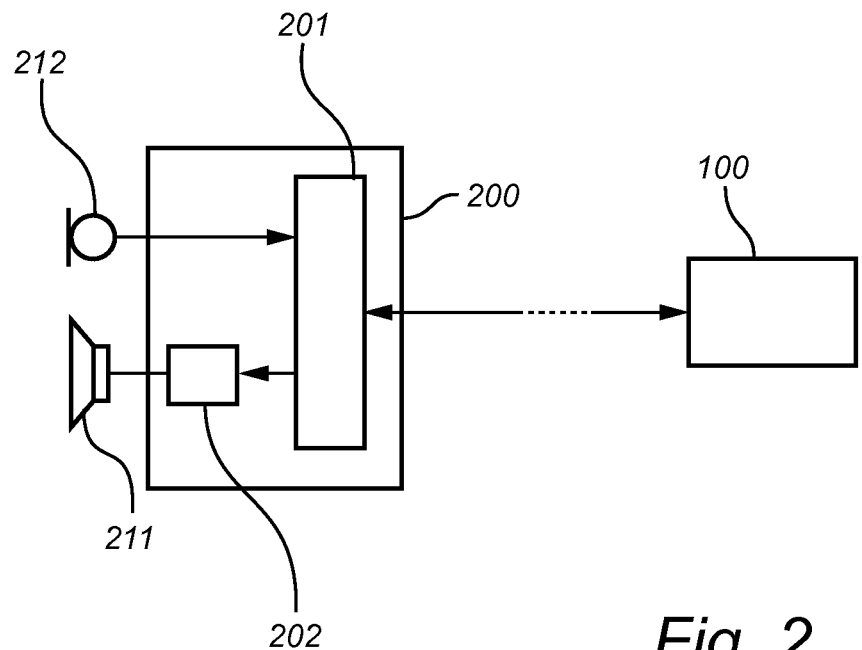
FIGS. 2 and 3 shows details of conferencing endpoints according to two example embodiments.
Figure 3:
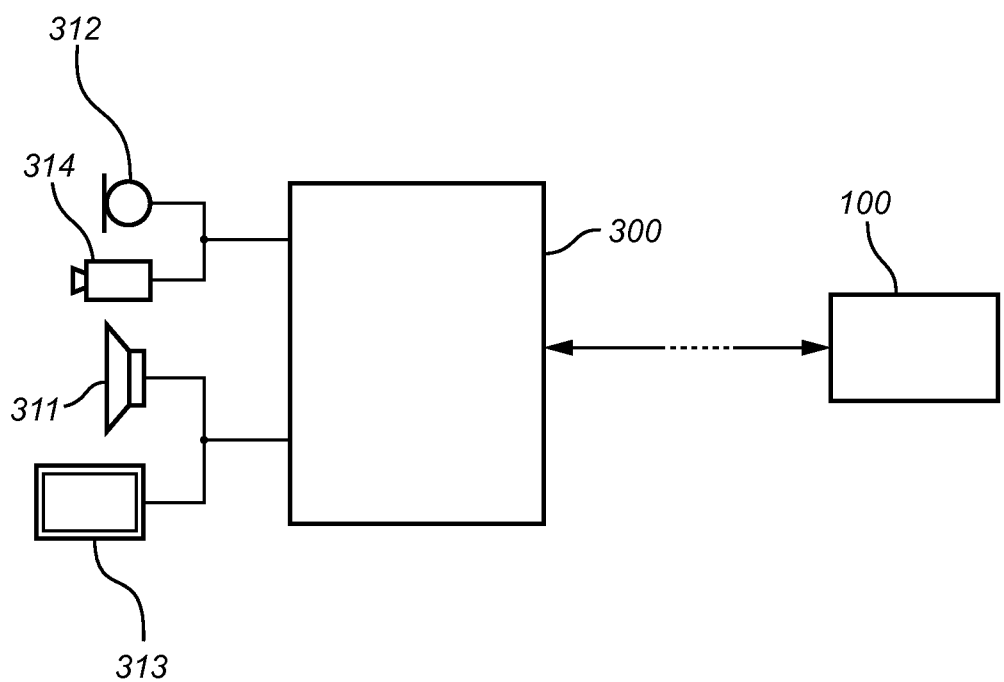

Specific implementations of conferencing endpoints are shown in FIGS. 2 and 3. The conferencing endpoint 200 in FIG. 2 includes, in addition to media capturing means 212 and media rendering means 211, an interface 201 adapted to receive a bitstream from the conferencing server 100 and to despatch a bitstream towards the conferencing server 100. The interface 201 may perform media data packing and unpacking operations, e.g., converting the media data from an internal representation suitable for processing and rendering in the conferencing endpoint 200 and a transport format suitable for exchanging media data with the server 100 over the communication network. The conferencing endpoint 200 in FIG. 2 additionally includes a processor 202, allowing the endpoint to accept delegated processing tasks. As outlined in the previous sections, the server 100 may choose to communicate a processing task, which is necessary or at least desirable before rendering the media, from itself to the receiving endpoint. On a practical level, this may entail identifying the delegated operation (and optionally values of relevant parameters) and communicating this information to the endpoint. Preferably, the delegated operation is communicated by means of an outgoing bitstream from the server 100, so that the media data that are to be the subject of the delegated operation arrive at the receiving endpoint concurrently or in close time proximity with the information relating to the delegated operation itself.

As illustrated by the conferencing endpoint 300 in FIG. 3, the capturing and rendering means over which a conferencing endpoint disposes may be of a multimedia type, including at least one loudspeaker 311 or loudspeaker array, microphone 312 or microphone array, video screen 313 or projector, and imaging device, in particular a camera 314.

In this example embodiment, the conferencing system has a hierarchical structure in that the conferencing server 100 in FIG. 1 is responsible for providing, preferably in real time, each conferencing endpoint 110, 120, 130, 140, 150 with mix of media data captured at the other endpoints, said mix being suited to convey the spoken contributions to the conference as well as secondary information, such as precomposed presentation material, live imagery showing body language, echo, noise and other acoustic cues reflecting the environment of the other participants, acoustic cues synthesized by the system to help discern different voices etc. This "mix" may in fact consist of forwarded media data from a single endpoint, at least in time intervals where only one participant is active.

In this example embodiment the media data include audio data encoded in accordance with a family of layered audio formats described in Table 1.

TABLE 1

Layered audio formats

| Audio format | Description |
|---|---|
| E1 | A monophonic signal representing a dominating part of an originally captured sound field (typically with no dynamics/spectral processing applied thereto). Signal E1 may be generated from a horizontal B-format signal captured by a microphone array. |
| E1 g | The above signal E1 with additional metadata ("g") which facilitate creation of a dynamically processed (e.g., having undergone dynamic range compression) and/or spectrally processed (e.g., noise suppressed, equalized) version of the E1 signal suitable for playback on a monophonic device (e.g., a traditional telephone). The metadata "g" are typically indicative of a frequency-banded gain profile (or gain curve). For example, "g" may be indicative of a banded gain profile determining a fully cleaned (or an approximation of a fully cleaned) version of the E1 signal. The metadata g may be regarded as differential encoding a fully cleaned (or an approximation to a fully cleaned) version of the E1 signal. |
| E1 g Th | The above-described "E1 g" layer plus an additional metadata layer ("Th") which facilitates upmixing for rendering of the sound (indicated by layer E1 g) as an output sound field (for playback on multiple loudspeakers) indicative of the content (e.g., conference participant utterances) of layer E1 g (i.e., an output sound field containing only utterances of a dominant conference participant), which will be perceived as being emitted from some source position relative to the listener. The metadata Th may act as spatial parameters for use in spatial synthesis applied to the monophonic layer generated by the "E1 g" layer, to generate a sound field representation. |
| E1 g Th E2 E3 K | The "E1 g Th" layers plus residual signals E2, E3 and metadata "K" which allow full reconstruction of an original spatial acoustic sound field (minus any coding loss) suitable for rendering over headphones using binaural virtualization techniques or for rendering over a loudspeaker array using sound field decoding techniques. The original sound field is assumed to have a multichannel representation (W X Y), indicative of sound captured by a microphone array, to which some light processing may have been applied. The originally captured sound field (W X Y) is also assumed to have a rotated or mixed representation (E1 E2 E3) which is an instantaneously (or based on values of the captured sound field from a relatively short time period e.g. using time smoothing) rotated or mixed version of W X Y, where E1 is the above-mentioned monophonic signal representing a dominant part of the captured sound field. The rotation and mixing may be based on KLT techniques, as further described in the provisional U.S. application No. 61/703,857. The metadata "K" are indicative of rotation parameters (or decomposition parameters) used in the mapping of W X Y to E1 E2 E3 or conversely, and can be used for full reconstruction of W X Y from E1 E2 E3 K. Typically, the metadata "K" indicate a specification of the rotation (or transformation), and if utilized, parametric encoding or waveform re-synthesis information. The metadata "g" may be indicative of a banded gain profile determining fully cleaned versions of the E1 E2 and E3 signals or an approximation of fully cleaned versions. |
| E1 g E2 E3 K | The E1 g Th E2 E3 K layer but without the metadata "Th". This layer allows full reconstruction of an original spatial acoustic sound field (minus any coding loss) suitable for rendering over headphones using binaural virtualization techniques or for rendering over a loudspeaker array using sound field decoding techniques. |

In variations to this example embodiment, the conferencing system may include more than one server. For instance, a support server (not shown) relaying the bitstream from an endpoint to a central server may be entrusted with tasks such as 'cleaning' the incoming bitstreams from ambient noise and gating out time intervals where the participant is inactive.

Resuming the description of the present example embodiment, a possible inner structure of the conferencing server 100 is shown in FIG. 1. The exchange of incoming and outgoing bitstreams with the endpoints is handled via an interface 101. Depending on design choices around the distribution of tasks, the interface 101 may process the incoming bitstreams I1, I2, I3, I4, I5 or may simply forward the bitstreams to a processor 103 and a pre-processor 104 located downstream of the interface 101 and parallel to one another. The processor 103 cooperates with a memory 102 in which a plurality of memory spaces are defined. The processor 103 is capable of performing any operation selected from a collection of primitives, and is media-enabled in the sense that each of these operations inputs media data from one or more of the memory spaces and/or outputs media data to one or more of the memory spaces. The collection or primitives may include operations of the following generic types:
  associating audio data with a gain;
  changing an existing gain associated with audio data;
  packing media data stored in a memory space to allow it to be transmitted as a bitstream;
  unpacking media data received as a bitstream and storing it in a memory space;
  transforming audio data between the frequency domain and time domain;
  additively mixing frequency-domain audio data, in particular KLT-compressed audio data;
  additively mixing time-domain audio data;
  changing a media data format, including an audio channel configuration and/or a metadata configuration.

In the example with the layered audio formats, the collection of primitives may be defined as shown in Tables 2 and 3.

TABLE 2

| Operand classes | |
|---|---|
| ax | block of decoded (PCM) audio |
| dx | block of encoded (e.g., DCT domain) audio |
| gx | frequency-dependent gain profile |
| ix | immediate value (station identifier, channel identifier) |
| kx | decomposition/rotation parameters (KLT) |
| px | encoded data channel |
| rx | rotation angle (first part of "Th" value) |
| wx | directionality factor (second part of "Th" value) |
| xx | scalar gain, in particular frequency-independent gain |

This example formalism allows precise control of the memory spaces in which the operands are stored. The memory spaces adapted to receive encoded data channels (denoted gx, where x is an integer associated with a particular memory space) may be located in a buffer for incoming and outgoing bitstream packets, the buffer being located for example in the interface 101 or the memory 102. Blocks of encoded or decoded audio data are stored in memory spaces/registers (denoted dx and ax, respectively) of the memory 102, to which the processor 103 has fast and reliable access. In other example embodiments, the primitives may be defined in a hardware-agnostic fashion, whereby some or all instructions leave the choice of the memory spaces to the processor, which at runtime generates a symbol table associating memory spaces and declared variables.

TABLE 3

| Instructions | |
|---|---|
| nop( ) | No operation. Useful during the optimization to replace instructions without moving them within the program. |
| p0 = recv (i0, i0) | Receive encoded channel i1 from station i0 and place result in p0. |
| send(p0, i0) | Send encoded channel p0 to station i0. |
| d0 = unpack(p0) | Unpack E1 layer from encoded channel p0 into d0. |
| d0, g0 = unpack(p0) | Unpack E1, g layers from encoded channel p0 into d0, g0. |
| d0, g0, r0, w0 = unpack(p0) | Unpack E1, g, Th layers from encoded channel p0 into d0, g0, r0, w0. |
| d0, g0, r0, w0, d1, d2, k0 = unpack(p0) | Unpack E1, g, Th, E2E3K layers from encoded channel p0 into d0, g0, r0, w0, d1, d2 and k0. |
| p0 = pack(d0) | Pack E1 layer into encoded channel p0. |
| p0 = pack(d0, g0) | Pack E1, g layers into encoded channel p0. |
| p0 = pack(d0, g0, r0, w0) | Pack E1, g, Th layers into encoded channel p0. |
| p0 = pack(d0, g0, r0, w0, d1, d2, k0) | Pack E1, g, Th, E2E3K layers into encoded channel p0. |
| a0 = decode(d0) | Perform inverse transform on d0 into a0. |
| d0 = encode(a0) | Perform forward transform on a0 into d0. |
| d3, d4, d5, k0 = iklt(d0, d1, d2, k0) | Reconstruct E1, E2, E3, K sound field in d0, d1, d2, k0 into WXY representation in d3, d4, d5, k0. |
| d3, d4, d5, k0 = klt(d0, d1, d2) | Decompose W, X, Y sound field in d0, d1, d2 into E1, E2, E3, K representation in d3, d4, d5, k0. |
| d3, d4, d5 = rotate(d0, d1, d2, r0, x0) | Apply rotation r0 and gain x0 to WXY sound field in d0, d1, d2 and leave result in d3, d4, d5. |
| d1, d2, d3 = upmix(d0, t0, w0, x0) | Upmix E1, theta representation in d0, t0, w0, apply gain x0, and produce WXY representation in d1, d2, d3. This is an optional macro-instruction which may be converted to a series of linear add( ) and gain( ) operations during optimization. This replacement may allow the optimizer to eliminate, for example, multiplications by 0 or 1. |
| d2 = add(d0, d1) or d2 = d0 + d1 | Add d0 to d1 and put result in d2. |
| d1 = gain(d0, x0) or d1 = d0 * x0 | Apply gain x0 to d0 and place result in d1. |
| d1 = gain(d0, g0) or d1 = d0 * g0 | Apply gain curve (gain profile) g0 to d0 and place result in d1. |
| p1 = gain(p0, g0) | Apply gain curve p0 to g0 and place result in p1 by bit-bashing (bit manipulating) exponents in the packed data. |
| g2 = add(g0, d0, g1) | Apply gain curve g0 to d0 and add result to d1. |
| r2 = add(r0, r1) | Add rotation angles. |
| x2 = gain(x0, x1) | Multiply scalar gains. |
| x0, x1 = exp(r0) | Calculate cosine and sine of rotation angle r0 and place results in x0, x1. |
| r0 = i0 | Initialize rotation angle from immediate in range [0, 355]. |
| x0 = i0 | Initialize gain value from immediate in range [0, 256]. |
| w0 = i0 | Initialize directionality factor from immediate in range [0, 256]. |
| d0 = silence( ) | Initialize d0 to silence. |
| g0 = flat( ) | Initialize a unitary flat gain profile in g0. |
| g1 = g0 | Move a gain from one register (or memory space) to another. These can usually be eliminated during optimization, but may be useful during intermediate optimization phases. |
| d1 = ngain(d0, x0) | Apply gain −x0 to d0 and place result in d1. |
| d1 = d0 | Move audio from one register to another. These can usually be eliminated during optimization, but may be useful during intermediate optimization phases. |
| r1 = r0 | Move a rotation angle from one register to another. These can usually be eliminated during optimization, but may be useful during intermediate optimization phases. |
| w1 = w0 | Move a directionality factor from one register to another. These can usually be eliminated during optimization, but may be useful during intermediate optimization phases. |
| x1 = x0 | Move a scalar gain from one register to another. These can usually be eliminated during optimization, but may be useful during intermediate optimization phases. |
| p1 = p0 | Move a packet from one register to another. These can usually be eliminated during optimization, but may be useful during intermediate optimization phases. |
| w2 = sub(w0, w1) | Subtract w1 from w0 and place the result in w2. |
| x1 = gain(x0, w0) | Multiply x0 by w0 and place the result in x1. |
| x1 = w0 | Cast a directionality factor to a scalar gain. |

As the "send" instruction in Table 3 illustrates, the collection of primitives may include operations controlling the interface 101 as well.

It is noted that the instructions may be polymorphic with respect to the data type of the arguments (in this case the format of the media data), as "gain", "=", "+" and "*" in Table 3. Alternatively, there is no function overloading, and instead each instruction is implemented as a family of sub-instructions, each being defined for a specific data type or combination of data types.

Further operations that can be similarly expressed in terms of primitives include any final stage rendering or composite creation of signals for the actual device output, for example the actual headphone or speaker signals. This process may require the addition of some more complex filtering operations which are generally well known to those skilled in the art of media-related signal processing. Some examples of additional audio operations not explicitly covered in the sets presented in the embodiments in this work include reverberation, filtering, time shift or stretching, binaural filtering, transcoding between formats and other linear and non-linear processing associated with creating the final presentation of audio. Operations and primitives that would be applicable at the final rendering stage for audio can be represented in a common form of filter block designs such as infinite impulse response filters, finite impulse response filters and larger convolutions. Such operations for rendering would also take input from control parameters suitable for effecting the perceptual characteristics of the rendered audio in some spatial or scene composition sense.

In other embodiments, the use of macros or a functional language may be used to provide an effective short hand or higher level specification of common aspects of the mixing strategy. In such cases, the translation of higher level or hierarchical language structures into the basic executable language without any optimization is also well known. An example of such structure has already been presented in this work, in the rotation operation for a sound field.

In this disclosure, the operations constituting the primitives may themselves be fairly complex and large operations of machine operation or specific processor operation in any realized embodiment. As the efficient implementation of such operations is well posed and well known, the specific implementation of the mixing primitives is a subject of lesser interest in this disclosure than the higher layer of more effective optimization. By the definition and use of the primitives as set out in this work, the design process is generally simplified by forcing a functional design where blocks of high computational intensity digital signal processing are coded and optimized for the actual target processor only once.

The pre-processor 104 receives the mixing strategy M and supplies the processor 103 with a run list of operations which achieves the mixing strategy or, depending on the implementation, a best-effort version of the mixing strategy M. The pre-processor 104 further takes into account at least the current momentary activity in each incoming bitstream, in particular the momentary audio activity or voice activity in particular. Different ways in which the pre-processor 104 may proceed in order to derive the run list will be described in what follows.

For the purposes of this description, the mixing strategy M may be considered an external factor outside the control of the pre-processor 104, which may be provided as a predefined setting to the conferencing server 100. The mixing strategy M may also be prepared in the conferencing server 100, for example by a mixing selector 105, which has been drawn as an optional component in FIG. 1. The mixing selector 105 monitors current and historic momentary activity in the incoming bitstreams and makes repeated decisions on the set of participants for which media data are to be transmitted to the other participants. The mixing strategy may therefore vary over time in response to momentary activity at each conferencing endpoint, so as to follow the specific behaviours of the participants and/or automatically give appropriate priority to a chairperson or moderator.

The pre-processor 104 supplies the run list to the processor 103, which executes the list in order to obtain, based on the incoming bitstreams I1, I2, I3, I4, I5, the outgoing bitstreams O1, O2, O3, O4, O5, which are forwarded to the interface 101 and then transmitted to the conferencing endpoints 110, 120, 130, 140, 150. It is noted that all outgoing bitstreams O1, O2, O3, O4, O5 need not be unique; for instance, bitstreams intended for two conferencing endpoints having the same momentary activity status and the same rendering capabilities may typically carry identical or near-identical media data.

Having described the general structure of hardware structure and processing paths of the conferencing system, focus will now lie on the pre-processor's 104 derivation of the run list based on the momentary activity in the incoming bitstreams I1, I2, I3, I4, I5 and the received mixing strategy M. Three main approaches will be described in what follows:
 1. pruning of an initial run list;
 2. constrained or non-constrained minimization of a cost function; and
 3. automatic code generation.

2.2 Pruning

According to the first approach, the pre-processor 104 receives the mixing strategy in the form of an initial run list. The output which the initial run list causes the processor 103 to produce defines the mixing strategy. The initial run list may be of a very high generality, e.g., code that assumes all conferencing endpoints in each conference to be active and transmitting in the richest media format defined and that produces a mix of media from all endpoints or, alternatively, an individual side tone-free complete mix for every endpoint.

The pruning, which includes removing and/or adapting operations in the initial run list or arguments of such operations, is based at least on the momentary media activity in the incoming bitstreams I1, I2, I3, I4, I5, which defines, together with the mixing strategy M, the mixing configuration to be implemented in target code. In the course of the pruning, detected negative activity (or inactivity) in a bitstream will make it possible to modify, without any change in the end result, any operations involving this bitstream on the input side in such manner that the bitstream will not contribute. For instance, without affecting the end result to be produced by the processor 103, it may be possible to remove an operation converting packets of the inactive bitstream into a representation enabling processing, and an operation involving mixing the bitstream with another bitstream may be replaced by a simple forwarding of (or copying of or reference to) the other bitstream in the run list. For example, it may be helpful to consider multiply operations by 0 or 1: an audio signal multiplied by 1 will be unaltered and this operation can be replaced by a null operation; and an audio signal multiplied by 0 will be silent and will not alter any other signal it is added to.

Further simplifications of the initial run list may be possible based on a finding that an incoming bitstream carries media data in accordance with a reduced format, at least when the collection of primitives is not defined with type polymorphism. In example embodiments, the conferencing server 100 may be configured to support a family of layered audio formats similar to those described in Table 1; because the simpler formats lack same of the higher layers, operations relating to such layers can be simply omitted from the run list, and operations acting on multiple layers (e.g., "+" defined for the format E1 g Th) can be replaced by simplified operations on a subset of the multiple layers (e.g., "+" defined for the format E1 g).

Additionally, the pruning may include further actions such as:
 1. Common sub-expression elimination: For a source operand, replace with an alternative source operand generated further up the program by an instruction with the same opcode and the same operands as the instruction that generated the existing source operand, e.g., planning including identifying groups of two or more nodes that require outgoing bitstreams with the same media data content,
 2. Dead code removal: Replace an instruction, none of whose outputs are used, by a nop( )
 3. Redundant copy elimination: Replace any source operand that has been produced by a move instruction by the source of the move instruction,
 4. Constant propagation: A family of specific optimizations based on known (constant) operands of instructions. Some of the applicable propagations are listed for each of a number of instructions in Table 4 below,
 5. nop( ) elimination: Remove nops from the program, and
 6. Register renaming: Rename registers in the program to use the minimum set of registers required by the set of concurrently live variables.

TABLE 4

Substitutions used in constant propagation

| | |
|---|---|
| d2 = add(d0, d1) | silence + d1 → d1; d0 + silence → d0 |
| d1 = gain(d0, x0) | d0 * 0 → silence; silence * g0 → silence; d0 * 1 → d0 |
| d1 = gain(d0, g0) | d0 * flat → d0; silence * g0 → silence |
| r2 = add(r0, r1) | rliteral + rliteral → rliteral; r0 + 0 → r0; 0 + r0 → r0 |

TABLE 4-continued

Substitutions used in constant propagation

| | |
|---|---|
| x2 = gain(x0, x1) | xliteral * xliteral → xliteral; x0 * 1 → x0; x0 * 0 → 0; 1 * x0 → x0; 0 * x0 → x0 |
| x0, x1 = exp(r0) | exp(rliteral) → xliteral, xliteral |
| g2 = add(g0, d0, g1, d1) | flat, d0 + flat, d1 → flat; g0, silence + g1, d1 → g1; g0, d0 + g1, silence → g0 |
| p1 = gain(p0, g0) | p0 * flat → p0 |
| d0 = ngain(d0, x0) | d0*0 → silence; silence*x0 → silence |
| w2 = sub(w0, w1) | wliteral − wliteral → wliteral |
| x1 = gain(x0, w0) | literal * literal → literal; x0 * 0 → 0; 0* w0 → 0; 1 * w0 → w0; x0 * 1 → x0 |

In Table 4, "silence" refers to a "d" register which is known to contain all zeros; "flat" refers to a "g" register that specifies unity gain at all frequencies; and "rliteral" ("xliteral", "wliteral") is used for an "r" ("x", "w") register the value of which is predetermined, typically because a preceding instruction has initialized it with a literal integer value.

2.2.1 Short Examples

Consider the following first code example in terms of instructions differing to some extent from those defined in Tables 2 and 3. Assembler-style formalism is used, by which the first argument is the output. The instructions recv, unpack, pack and send explicitly accept an argument explicitly identifying the data type of the operand. Further, all memory spaces are denoted dx, no distinction being made between encoded data channels, encoded and decoded blocks of data.

| | |
|---|---|
| recv | d0, s0, c0, E1g |
| unpack | d1, d0, E1g |
| recv | d2, s1, c0, E1g |
| unpack | d3, d2, E1g |
| recv | d4, s2, c0, E1gThE2E3k |
| unpack | d5, d4, E1gThE2E3k |
| recv | d6, s3, c0, E1gThE2E3k |
| unpack | d7, d6, E1gThE2E3k |
| move | d8, d5 |
| add | d9, d8, d7 |
| add | d10, d9, d3 |
| pack | d11, d10, E1g |
| send | d11, s0, c0, E1g |
| move | d12, d5 |
| add | d13, d12, d7 |
| add | d14, d13, d1 |
| pack | d15, d14, E1g |
| send | d15, s1, c0, E1g |
| move | d16, d7 |
| add | d17, d16, d1 |
| add | d18, d17, d3 |
| pack | d19, d18, E1gThE2E3k |
| send | d19, s2, c0, E1gThE2E3k |
| move | d20, d5 |
| add | d21, d20, d1 |
| add | d22, d21, d3 |
| pack | d23, d22, E1gThE2E3k |
| send | d23, s3, c0, E1gThE2E3k |

This simple initial run list starts by receiving all the input audio packets and unpacking them to the MDCT domain. Next a series of "move" and "add" instructions mix an output for each client (endpoint). These are then packed and sent back to the clients. After the pruning actions outlined above have been applied, the final run list may be significantly shortened and have the following appearance:

| | |
|---|---|
| recv | d0, s0, c0, E1g |
| unpack | d1, d0, E1g |
| recv | d2, s1, c0, E1g |
| unpack | d3, d2, E1g |
| recv | d4, s2, c0, E1gThE2E3k |
| unpack | d5, d4, E1gThE2E3k |
| recv | d6, s3, c0, E1gThE2E3k |
| unpack | d7, d6, E1gThE2E3k |
| add | d9, d5, d7 |
| add | d10, d9, d3 |
| pack | d11, d10, E1g |
| send | d11, s0, c0, E1g |
| add | d14, d9, d1 |
| pack | d15, d14, E1g |
| send | d15, s1, c0, E1g |
| add | d17, d7, d1 |
| add | d18, d17, d3 |
| pack | d19, d18, E1gThE2E3k |
| send | d19, s2, c0, E1gThE2E3k |
| add | d21, d5, d1 |
| add | d22, d21, d3 |
| pack | d23, d22, E1gThE2E3k |
| send | d23, s3, c0, E1gThE2E3k |

In a second example, only two mono endpoints are in a conference, and the naive code in the initial run list looks as follows. Each input is unpacked and in a way mixed (i.e. moved to an output register since there is only one thing to mix) after which point they are repacked.

| | |
|---|---|
| recv | d0, s0, c0, E1g |
| unpack | d1, d0, E1g |
| recv | d2, s1, c0, E1g |
| unpack | d3, d2, E1g |
| move | d4, d3 |
| pack | d5, d4, E1g |
| 6: send | d5, s0, c0, E1g |
| move | d6, d1 |
| pack | d7, d6, E1g |
| send | d7, s1, c0, E1g |

Applying the above rules, the pre-processor 104 reduces this program to packet forwarding as expected:

| | |
|---|---|
| recv | d0, s0, c0, E1g |
| recv | d2, s1, c0, E1g |
| send | d2, s0, c0, E1g |
| send | d0, s1, c0, E1g |

In a third example, where again the formalism of Tables 2 and 3 is used, a server that hosts a conference containing three PSTN endpoints, each of which needs to hear a mix of the other two. The higher-level mixing strategy stipulates that all mixing must be done at the server, and generates a program fragment for each downstream link, which contains a mix of the other two input endpoints' streams:

| Endpoint program 0 (PSTN 0): |
|---|
| 0: p0 = recv(1, 0) |
| 1: d0, g0 = unpack(p0) |
| 2: d1 = gain(d0, g0) |
| 3: p1 = recv(2, 0) |
| 4: d2, g1 = unpack(p1) |
| 5: d3 = gain(d2, g1) |
| 6: d4 = add(d1, d3) |
| 7: p2 = pack(d4) |
| 8: send(p2, 0) |

Endpoint program 1 (PSTN 1):

```
0: p0 = recv(0, 0)
1: d0, g0 = unpack(p0)
2: d1 = gain(d0, g0)
3: p1 = recv(2, 0)
4: d2, g1 = unpack (p1)
5: d3 = gain(d2, g1)
6: d4 = add(d1, d3)
7: p2 = pack(d4)
8: send (p2 ,1)
```

Endpoint program 2 (PSTN 2):

```
0: p0 = recv(0, 0)
1: d0, g0 = unpack(p0)
2: d1 = gain(d0, g0)
3: p1 = recv(1, 0)
4: d2, g1 = unpack(p1)
5: d3 = gain(d2, g1)
6: d4 = add(d1, d3)
7: p2 = pack(d4)
8: send(p2, 2)
```

These program fragments are first individually optimised then concatenated (with appropriate register renaming) into a full program which deals with all down streams:

Output program 0:

```
0: p0 = recv(1, 0)
1: d0, g0 = unpack(p0)
2: d1 = gain(d0, g0)
3: p1 = recv(2, 0)
4: d2, g1 = unpack(p1)
5: d3 = gain(d2, g1)
6: d4 = add(d1, d3)
7: p2 = pack(d4)
8: send(p2, 0)
9: p3 = recv(0, 0)
10: d5, g2 = unpack(p3)
11: d6 = gain(d5, g2)
12: p4 = recv(2, 0)
13: d7, g3 = unpack(p4)
14: d8 = gain(d7, g3)
15: d9 = add(d6, d8)
16: p5 = pack(d9)
17: send(p5, 1)
18: p6 = recv(0, 0)
19: d10, g4 = unpack(p6)
20: d11 = gain(d10, g4)
21: p7 = recv(1, 0)
22: d12, g5 = unpack(p7)
23: d13 = gain(d12, g5)
24: d14 = add(d11, d13)
25: p8 = pack(d14)
26: send(p8, 2)
```

Now, this output program is optimized by eliminating common sub-expressions in lines 13-15, 19, 20, 22-24, followed by dead code removal (transforming into nop( ) in lines 12-14, 18-23 (as dynamically renumbered), followed by dead code elimination (stripping of nine instances of nop( )). The registers have then been renamed as follows:

|     | p | d | a | g | k | x | r | w | i |
|-----|---|---|---|---|---|---|---|---|---|
| IN  | 6 | 9 | 0 | 3 | 0 | 0 | 0 | 0 | 0 |
| OUT | 1 | 3 | 0 | 1 | 0 | 0 | 0 | 0 | 0 |

This optimization process returns the following final program:

Output program 0:

```
0: p0 = recv (1, 0)
1: d1, g0 = unpack (p0)
2: d1 = gain (d1, g0)
3: p0 = recv (2, 0)
4: d2, g0 = unpack (p0)
5: d2 = gain(d2, g0)
6: d0 = add (d1, d2)
7: p0 = pack (d0)
8: send (p0, 0)
9: p0 = recv (0, 0)
10: d0, g0 = unpack (p0)
11: d0 = gain (d0, g0)
12: d2 = add (d0, d2)
13: p0 = pack (d2)
14: send (p0, 1)
15: d0 = add (d0, d1)
16: p0 = pack (d0)
17: send (p0, 2)
```

It is noted that intermediate results of recv and unpack operations have been removed (in four out of six instances of each), and the instruction count has decreased from 26 to 17. The program also requires a much smaller set of registers, reusing them wherever possible.

2.2.2 Optimization for Servers with Multiple Parallel Execution Threads

In servers which have multiple parallel execution threads, preferably a separate output program is built for each execution thread. Endpoint program fragments are assigned to threads based the input endpoints for which they invoke recv( ). This makes it possible to efficiently partition endpoint processing without the optimization code needing to have any knowledge of which conference each endpoint belongs to. The algorithm for this proceeds as follows:

1. Initialize a desired number of output programs. The output programs may be initialized as empty programs.
2. For each endpoint program fragment, analyze each recv( ) instruction.
3. For each output program, if that recv( ) is for an endpoint that has already been recv( )'ed in that output program, increment a score for that output program.
4. If one output program has a higher score than the others, concatenate this endpoint program fragment onto that output program with appropriate register renaming.
5. If there is a tie for the highest score among output programs, concatenate onto the shortest of the tied candidates.
6. If there is a tie in both highest score and shortest length among output programs, choose one of the tied candidates using some convenient tie-breaker. For example: at random, or lowest index in an array etc. This rule may be decisive when the first endpoint program fragment is processed if the output programs are initialized as empty.
7. Once the endpoint program fragment has been concatenated onto one of the output programs, proceed to the next endpoint program fragment until all fragments have been concatenated onto an output program.

Protection is sought for this algorithm, which is believed to have independent inventive merit, both when used to prepare code for a conferencing server and for other applications. Protection is also sought for devices and computer program products embodying the algorithm and putting it to use.

It is noted that the endpoint program fragments may be obtained by splitting an initial run list into smaller fragments, which are then fed to the above algorithm for efficient restructuring into two or more output programs constituting the run list.

Furthermore, one or more of the threads may execute on an external computing device. This makes the above approach available also to servers without a multitasking ability in themselves.

2.2.3 A More Complete Example

In an expanded example, the server hosts two conferences. The first conference has three sound field endpoints (sound field upstream, sound field downstream) and two headset endpoints (mono upstream, sound field downstream). The second conference has two headset endpoints and two PSTN endpoints (mono upstream, mono downstream).

The mixing strategy initially writes a program fragment for each of the nine endpoints which mixes together all the other endpoints in the conference. For example, here is the endpoint program for the first sound field endpoint:

```
Endpoint program 0 (flux 0):

0: r0 = 0
 1: x0 = 256
 2: p0 = recv(1, 0)
 3: d0, g0, r1, w0, d1, d2, k0 = unpack(p0)
 4: d3, d4, d5 = iklt(d0, d1, d2, k0)
 5: d6, d7, d8 = rotate(d3, d4, d5, r0, x0)
 6: r2 = 120
 7: x1 = 256
 8: p1 = recv(2, 0)
 9: d9, g1, r3, w1, d10, d11, k1 = unpack(p1)
10: d12, d13, d14 = iklt(d9, d10, d11, k1)
11: g2 = add(g1, d12, g0, d6)
12: d15, d16, d17 = rotate(d12, d13, d14, r2, x1)
13: d18 = add(d6, d15)
14: d19 = add(d7, d16)
15: d20 = add(d8, d17)
16: r4 = 2
17: x2 = 256
18: w2 = 128
19: p2 = ecv(3, 0)
20: d21, g3 = unpack(p2)
21: g4 = add(g3, d21, g4, d18)
22: d22, d23, d24 = upmix(d21, r4, w2, x2)
23: d25 = add(d18, d22)
24: d26 = add(d19, d23)
25: d27 = add(d20, d24)
26: r5 = 355
27: x3 = 256
28: w3 = 128
29: p3 = recv(4, 0)
30: d28, g5 = unpack(p3)
31: g6 = add(g5, d28, g6, d25)
32: d29, d30, d31 = upmix(d28, r5, w3, x3)
33: d32 = add(d25, d29)
34: d33 = add(d26, d30)
35: d34 = add(d27, d31)
36: r6 = 0
37: w4 = 256
38: d35, d36, d37, k2 = klt(d32, d33, d34)
39: p4 = pack(d35, g6, r6, w4, d36, d37, k2)
40: send(p4, 0)
```

Each of these ten endpoint programs are then optimized individually, in particular by removing common sub-expressions, eliminating copy operations, transformation into nop( ), constant propagation and dead code elimination. This is the resulting program for the first endpoint:

```
 0: r0 = 0
 1: p0 = recv(1, 0)
 2: d0, g0, r1, w0, d1, d2, k0 = unpack(p0)
 3: d3, d4, d5 = iklt(d0, d1, d2, k0)
 4: p1 = recv(2, 0)
 5: d9, g1, r3, w1, d10, d11, k1 = unpack(p1)
 6: d12, d13, d14 = iklt(d9, d10, d11, k1)
 7: x8 = −128
 8: x9 = 222
 9: d46 = gain(d13, x8)
10: d47 = ngain(d14, x9)
11: d48 = gain(d13, x9)
12: d49 = gain(d14, x8)
13: d50 = add(d46, d47)
14: d51 = add(d48, d49)
15: d18 = add(d3, d12)
16: d19 = add(d4, d50)
17: d20 = add(d5, d51)
18: p2 = recv(3, 0)
19: d21, g3 = unpack(p2)
20: x14 = 128
21: x15 = 4
22: w5 = 256
23: d52 = gain(d21, x14)
24: d54 = gain(d21, x15)
25: d25 = add(d18, d52)
26: d26 = add(d19, d52)
27: d27 = add(d20, d54)
28: p3 = recv(4, 0)
29: d28, g5 = unpack(p3)
30: g6 = add(g5, d28, g6, d25)
31: x21 = 127
32: x22 = −11
33: d55 = gain(d28, x14)
34: d56 = gain(d28, x21)
35: d57 = gain(d28, x22)
36: d32 = add(d25, d55)
37: d33 = add(d26, d56)
38: d34 = add(d27, d57)
39: d35, d36, d37, k2 = klt(d32, d33, d34)
40: p4 = pack(d35, g6, r0, w5, d36, d37, k2)
41: send(p4, 0)
```

It is intended to execute the programs on a server which has multiple parallel execution threads. The algorithm described in section 2.2.2 above is executed, with the below result of executing the algorithm. The first five endpoints (which belong to the first conference) end up in output program 0. The remaining four endpoints (which belong to the second conference) end up in output program 1.

```
Combining programs:

endpoint 0: 0 0 0 0 –> 0
endpoint 1: 4 0 0 0 –> 0
endpoint 2: 4 0 0 0 –> 0
endpoint 3: 4 0 0 0 –> 0
endpoint 4: 4 0 0 0 –> 0
endpoint 5: 0 0 0 0 –> 1
endpoint 6: 0 3 0 0 –> 1
endpoint 7: 0 3 0 0 –> 1
endpoint 8: 0 3 0 0 –> 1
```

The endpoint programs are now concatenated into output programs with appropriate register renaming and then each of them is optimized:

```
Output program 0:

0: r0 = 0
 1: p0 = recv(1, 0)
 2: d0, g0, r1, w0, d1, d2, k0 = unpack(p0)
 3: d3, d4, d5 = iklt(d0, d1, d2, k0)
```

Output program 0:

```
4: p1 = recv(2, 0)
5: d9, g1, r3, w1, d10, d11, k1 = unpack(p1)
6: d12, d13, d14 = iklt(d9, d10, d11, k1)
7: x8 = −128
8: x9 = 222
9: d46 = gain(d13, x8)
10: d47 = ngain(d14, x9)
11: d48 = gain(d13, x9)
12: d49 = gain(d14, x8)
13: d50 = add(d46, d47)
14: d51 = add(d48, d49)
15: d18 = add(d3, d12)
16: d19 = add(d4, d50)
17: d20 = add(d5, d51)
18: p2 = recv(3, 0)
19: d21, g3 = unpack(p2)
20: x14 = 128
21: x15 = 4
22: w5 = 256
23: d52 = gain(d21, x14)
24: d54 = gain(d21, x15)
25: d25 = add(d18, d52)
26: d26 = add(d19, d52)
27: d27 = add(d20, d54)
28: p3 = recv(4, 0)
29: d28, g5 = unpack(p3)
30: g6 = add(g5, d28, g6, d25)
31: x21 = 127
32: x22 = −11
33: d55 = gain(d28, x14)
34: d56 = gain(d28, x21)
35: d57 = gain(d28, x22)
36: d32 = add(d25, d55)
37: d33 = add(d26, d56)
38: d34 = add(d27, d57)
39: d35, d36, d37, k2 = klt(d32, d33, d34)
40: p4 = pack(d35, g6, r0, w5, d36, d37, k2)
41: send(p4, 0)
42: r4 = 0
43: p5 = recv(0, 0)
44: d58, g7, r5, w6, d59, d60, k3 = unpack(p5)
45: d61, d62, d63 = iklt(d58, d59, d60, k3)
46: p6 = recv(2, 0)
47: d67, g8, r7, w7, d68, d69, k4 = unpack(p6)
48: d70, d71, d72 = iklt(d67, d68, d69, k4)
49: x31 = −128
50: x32 = 222
51: d104 = gain(d71, x31)
52: d105 = ngain(d72, x32)
53: d106 = gain(d71, x32)
54: d107 = gain(d72, x31)
55: d108 = add(d104, d105)
56: d109 = add(d106, d107)
57: d76 = add(d61, d70)
58: d77 = add(d62, d108)
59: d78 = add(d63, d109)
60: p7 = recv(3, 0)
61: d79, g10 = unpack(p7)
62: x37 = 128
63: x38 = 4
64: w11 = 256
65: d110 = gain(d79, x37)
66: d112 = gain(d79, x38)
67: d83 = add(d76, d110)
68: d84 = add(d77, d110)
69: d85 = add(d78, d112)
70: p8 = recv(4, 0)
71: d86, g12 = unpack(p8)
72: g13 = add(g12, d86, g13, d83)
73: x44 = 127
74: x45 = −11
75: d113 = gain(d86, x37)
76: d114 = gain(d86, x44)
77: d115 = gain(d86, x45)
78: d90 = add(d83, d113)
79: d91 = add(d84, d114)
80: d92 = add(d85, d115)
81: d93, d94, d95, k5 = klt(d90, d91, d92)
82: p9 = pack(d93, g13, r4, w11, d94, d95, k5)
83: send(p9, 1)
84: r8 = 0
85: p10 = recv(0, 0)
86: d116, g14, r9, w12, d117, d118, k6 = unpack(p10)
87: d119, d120, d121 = iklt(d116, d117, d118, k6)
88: p11 = recv(1, 0)
89: d125, g15, r11, w13, d126, d127, k7 = unpack(p11)
90: d128, d129, d130 = iklt(d125, d126, d127, k7)
91: x54 = −128
92: x55 = 222
93: d162 = gain(d129, x54)
94: d163 = ngain(d130, x55)
95: d164 = gain(d129, x55)
96: d165 = gain(d130, x54)
97: d166 = add(d162, d163)
98: d167 = add(d164, d165)
99: d134 = add(d119, d128)
100: d135 = add(d120, d166)
101: d136 = add(d121, d167)
102: p12 = recv(3, 0)
103: d137, g17 = unpack(p12)
104: x60 = 128
105: x61 = 4
106: w17 = 256
107: d168 = gain(d137, x60)
108: d170 = gain(d137, x61)
109: d141 = add(d134, d168)
110: d142 = add(d135, d168)
111: d143 = add(d136, d170)
112: p13 = recv(4, 0)
113: d144, g19 = unpack(p13)
114: g20 = add(g19, d144, g20, d141)
115: x67 = 127
116: x68 = −11
117: d171 = gain(d144, x60)
118: d172 = gain(d144, x67)
119: d173 = gain(d144, x68)
120: d148 = add(d141, d171)
121: d149 = add(d142, d172)
122: d150 = add(d143, d173)
123: d151, d152, d153, k8 = klt(d148, d149, d150)
124: p14 = pack(d151, g20, r8, w17, d152, d153, k8)
125: send(p14, 2)
126: r12 = 0
127: p15 = recv(0, 0)
128: d174, g21, r13, w18, d175, d176, k9 = unpack(p15)
129: d177, d178, d179 = iklt(d174, d175, d176, k9)
130: p16 = recv(1, 0)
131: d183, g22, r15, w19, d184, d185, k10 = unpack(p16)
132: d186, d187, d188 = iklt(d183, d184, d185, k10)
133: x77 = −128
134: x78 = 222
135: d225 = gain(d187, x77)
136: d226 = ngain(d188, x78)
137: d227 = gain(d187, x78)
138: d228 = gain(d188, x77)
139: d229 = add(d225, d226)
140: d230 = add(d227, d228)
141: d192 = add(d177, d186)
142: d193 = add(d178, d229)
143: d194 = add(d179, d230)
144: p17 = recv(2, 0)
145: d195, g24, r17, w20, d196, d197, k11 = unpack(p17)
146: d198, d199, d200 = iklt(d195, d196, d197, k11)
147: x82 = −222
148: d232 = gain(d199, x77)
149: d233 = ngain(d200, x82)
150: d234 = gain(d199, x82)
151: d235 = gain(d200, x77)
152: d236 = add(d232, d233)
153: d237 = add(d234, d235)
154: d204 = add(d192, d198)
155: d205 = add(d193, d236)
156: d206 = add(d194, d237)
157: p18 = recv(4, 0)
```

| Output program 0: |
| --- |
| 158: d207, g26 = unpack(p18) |
| 159: g27 = add(g26, d207, g27, d204) |
| 160: x87 = 128 |
| 161: x88 = 4 |
| 162: w23 = 256 |
| 163: d238 = gain(d207, x87) |
| 164: d240 = gain(d207, x88) |
| 165: d211 = add(d204, d238) |
| 166: d212 = add(d205, d238) |
| 167: d213 = add(d206, d240) |
| 168: d214, d215, d216, k12 = klt(d211, d212, d213) |
| 169: p19 = pack(d214, g27, r12, w23, d215, d216, k12) |
| 170: send(p19, 3) |
| 171: r18 =0 |
| 172: p20 = recv(0, 0) |
| 173: d241, g28, r19, w24, d242, d243, k13 = unpack(p20) |
| 174: d244, d245, d246 = iklt(d241, d242, d243, k13) |
| 175: p21 = recv(1, 0) |
| 176: d250, g29, r21, w25, d251, d252, k14 = unpack(p21) |
| 177: d253, d254, d255 = iklt(d250, d251, d252, k14) |
| 178: x97 = −128 |
| 179: x98 = 222 |
| 180: d292 = gain(d254, x97) |
| 181: d293 = ngain(d255, x98) |
| 182: d294 = gain(d254, x98) |
| 183: d295 = gain(d255, x97) |
| 184: d296 = add(d292, d293) |
| 185: d297 = add(d294, d295) |
| 186: d259 = add(d244, d253) |
| 187: d260 = add(d245, d296) |
| 188: d261 = add(d246, d297) |
| 189: p22 = recv(2, 0) |
| 190: d262, g31, r23, w26, d263, d264, k15 = unpack(p22) |
| 191: d265, d266, d267 = iklt(d262, d263, d264, k15) |
| 192: x102 = −222 |
| 193: d299 = gain(d266, x97) |
| 194: d300 = ngain(d267, x102) |
| 195: d301 = gain(d266, x102) |
| 196: d302 = gain(d267, x97) |
| 197: d303 = add(d299, d300) |
| 198: d304 = add(d301, d302) |
| 199: d271 = add(d259, d265) |
| 200: d272 = add(d260, d303) |
| 201: d273 = add(d261, d304) |
| 202: p23 = recv(3, 0) |
| 203: d274, g33 = unpack(p23) |
| 204: g34 = add(g33, d274, g34, d271) |
| 205: x107 = 128 |
| 206: x108 = 4 |
| 207: w29 = 256 |
| 208: d305 = gain(d274, x107) |
| 209: d307 = gain(d274, x108) |
| 210: d279 = add(d272, d305) |
| 211: d280 = add(d273, d307) |
| 212: d280 = add(d273, d307) |
| 213: d281, d282, d283, k16 = klt(d278, d279, d280) |
| 214: p24 = pack(d281, g34, r18, w29, d282, d283, k16) |
| 215: send(p24, 4) |

| Output program 1: |
| --- |
| 0: p0 = recv(6, 0) |
| 1: d0, g0 = unpack(p0) |
| 2: x5 = 128 |
| 3: x6 = 4 |
| 4: w4 = 256 |
| 5: d21 = gain(d0, x5) |
| 6: d23 = gain(d0, x6) |
| 7: p1 = recv(7, 0) |
| 8: d4, g1 = unpack(p1) |
| 9: x12 = 127 |
| 10: x13 = −11 |
| 11: d24 = gain(d4, x5) |
| 12: d25 = gain(d4, x12) |
| 13: d26 = gain(d4, x13) |
| 14: d8 = add(d21, d24) |

| Output program 1: |
| --- |
| 15: d9 = add(d21, d25) |
| 16: d10 = add(d23, d26) |
| 17: p2 = recv(8, 0) |
| 18: d11, g3 = unpack(p2) |
| 19: g4 = add(g3, d11, g4, d8) |
| 20: x19 = 126 |
| 21: x20 = 20 |
| 22: d27 = gain(d11, x5) |
| 23: d28 = gain(d11, x19) |
| 24: d29 = gain(d11, x20) |
| 25: d15 = add(d8, d27) |
| 26: d16 = add(d9, d28) |
| 27: d17 = add(d10, d29) |
| 28: r3 = 0 |
| 29: d18, d19, d20, k0 = klt(d15, d16, d17) |
| 30: p3 = pack(d18, g4, r3, w4, d19, d20, k0) |
| 31: send(p3, 5) |
| 32: p4 = recv(5, 0) |
| 33: d30, g5 = unpack(p4) |
| 34: x26 = 128 |
| 35: x27 = 4 |
| 36: w9 = 256 |
| 37: d51 = gain(d30, x26) |
| 38: d53 = gain(d30, x27) |
| 39: p5 = recv(7, 0) |
| 40: d34, g6 = unpack(p5) |
| 41: x33 = 127 |
| 42: x34 = −11 |
| 43: d54 = gain(d34, x26) |
| 44: d55 = gain(d34, x33) |
| 45: d56 = gain(d34, x34) |
| 46: d38 = add(d51, d54) |
| 47: d39 = add(d51, d55) |
| 48: d40 = add(d53, d56) |
| 49: p6 = recv(8, 0) |
| 50: d41, g8 = unpack(p6) |
| 51: g9 = add(g8, d41, g9, d38) |
| 52: x40 = 126 |
| 53: x41 = 20 |
| 54: d57 = gain(d41, x26) |
| 55: d58 = gain(d41, x40) |
| 56: d59 = gain(d41, x41) |
| 57: d45 = add(d38, d57) |
| 58: d46 = add(d39, d58) |
| 59: d47 = add(d40, d59) |
| 60: r7 = 0 |
| 61: d48, d49, d50, k1 = klt(d45, d46, d47) |
| 62: p7 = pack(d48, g9, r7, w9, d49, d50, k1) |
| 63: send(p7, 6) |
| 64: p8 = recv(5, 0) |
| 65: d60, g10 = unpack(p8) |
| 66: d61 = gain(d60, g10) |
| 67: p9 = recv(6, 0) |
| 68: d62, g11 = unpack(p9) |
| 69: d63 = gain(d62, g11) |
| 70: d64 = add(d61, d63) |
| 71: p10 = recv(8, 0) |
| 72: d65, g12 = unpack(p10) |
| 73: d66 = gain(d65, g12) |
| 74: d67 = add(d64, d66) |
| 75: p11 = pack(d67) |
| 76: send(p11, 7) |
| 77: p12 = recv(5, 0) |
| 78: d68, g13 = unpack(p12) |
| 79: d69 = gain(d68, g13) |
| 80: p13 = recv(6, 0) |
| 81: d70, g14 = unpack(p13) |
| 82: d71 = gain(d70, g14) |
| 83: d72 = add(d69, d71) |
| 84: p14 = recv(7, 0) |
| 85: d73, g15 = unpack(p14) |
| 86: d74 = gain(d73, g15) |
| 87: d75 = add(d72, d74) |
| 88: p15 = pack(d75) |
| 89: send(p15, 8) |

During the optimization of output program 0, which is reduced from 215 instructions down to 99, the registers are renamed as follows:

Register renaming report:

|     | p  | d  | a | k  | x | r | w | i |
|-----|----|----|---|----|---|---|---|---|
| IN  | 10 | 93 | 0 | 10 | 8 | 7 | 4 | 4 | 0 |
| OUT | 1  | 21 | 0 | 7  | 1 | 6 | 2 | 2 | 0 | and during the optimization of output program 1, which is reduced from 89 instructions down to 56, the registers are renamed as follows:

Register renaming report:

|     | p | d  | a | k | x | r | w | i |
|-----|---|----|---|---|---|---|---|---|
| IN  | 8 | 39 | 0 | 6 | 2 | 6 | 1 | 1 | 0 |
| OUT | 1 | 12 | 0 | 5 | 1 | 4 | 1 | 1 | 0 |

The optimized output programs listed below will be interpreted on separate execution threads.

Output program 0:

```
 0: r0 = 0
 1: p0 = recv(1, 0)
 2: d18, g0, r1, w0, d15, d13, k0 = unpack(p0)
 3: d13, d15, d18 = iklt(d18, d15, d13, k0)
 4: p0 = recv(2, 0)
 5: d12, g0, r1, w0, d8, d10, k0 = unpack(p0)
 6: d10, d8, d12 = iklt(d12, d8, d10, k0)
 7: x1 = -128
 8: x2 = 222
 9: d9 = gain(d8, x1)
10: d19 = ngain(d12, x2)
11: d14 = gain(d8, x2)
12: d11 = gain(d12, x1)
13: d19 = add(d9, d19)
14: d14 = add(d14, d11)
15: d0 = add(d13, d10)
16: d1 = add(d15, d19)
17: d2 = add(d18, d14)
18: p0 = recv(3, 0)
19: d5, g0 = unpack(p0)
20: x5 = 128
21: x0 = 4
22: w0 = 256
23: d4 = gain(d5, x5)
24: d3 = gain(d5, x0)
25: d0 = add(d0, d4)
26: d1 = add(d1, d4)
27: d2 = add(d2, d3)
28: p0 = recv(4, 0)
29: d6, g2 = unpack(p0)
30: g6 = add(g2, d6, g6, d0)
31: x4 = 127
32: x3 = -11
33: d7 = gain(d6, x5)
34: d17 = gain(d6, x4)
35: d16 = gain(d6, x3)
36: d0 = add(d0, d7)
37: d1 = add(d1, d17)
38: d2 = add(d2, d16)
39: d2, d1, d0, k0 = klt(d0, d1, d2)
40: p0 = pack(d2, g6, r0, w0, d1, d0, k0)
41: send(p0, 0)
42: p0 = recv(0, 0)
43: d0, g6, r1, w1, d1, d2, k0 = unpack(p0)
44: d2, d1, d0 = iklt(d0, d1, d2, k0)
45: d20 = add(d2, d10)
46: d19 = add(d1, d19)
47: d14 = add(d0, d14)
```

Output program 0:

```
48: d20 = add(d20, d4)
49: d19 = add(d19, d4)
50: d14 = add(d14, d3)
51: g5 = add(g2, d6, g5, d20)
52: d20 = add(d20, d7)
53: d19 = add(d19, d17)
54: d14 = add(d14, d16)
55: d14, d19, d20, k0 = klt(d20, d19, d14)
56: p0 = pack(d14, g5, r0, w0, d19, d20, k0)
57: send(p0, 1)
58: d14 = gain(d15, x1)
59: d19 = ngain(d18, x2)
60: d15 = gain(d15, x2)
61: d18 = gain(d18, x1)
62: d14 = add(d14, d19)
63: d15 = add(d15, d18)
64: d2 = add(d2, d13)
65: d1 = add(d1, d14)
66: d0 = add(d0, d15)
67: d15 = add(d2, d4)
68: d14 = add(d1, d4)
69: d13 = add(d0, d3)
70: g4 = add(g2, d6, g4, d15)
71: d15 = add(d15, d7)
72: d14 = add(d14, d17)
73: d13 = add(d13, d16)
74: d13, d14, d15, k0 = klt(d15, d14, d13)
75: p0 = pack(d13, g4, r0, w0, d14, d15, k0)
76: send(p0, 2)
77: x1 = -222
78: d12 = ngain(d12, x1)
79: d8 = gain(d8, x1)
80: d9 = add(d9, d12)
81: d8 = add(d8, d11)
82: d2 = add(d2, d10)
83: d1 = add(d1, d9)
84: d0 = add(d0, d8)
85: g2 = add(g2, d6, g3, d2)
86: d6 = gain(d6, x0)
87: d8 = add(d2, d7)
88: d7 = add(d1, d7)
89: d6 = add(d0, d6)
90: d6, d7, d8, k0 = klt(d8, d7, d6)
91: p0 = pack(d6, g2, r0, w0, d7, d8, k0)
92: send(p0, 3)
93: g0 = add(g0, d5, g1, d2)
94: d2 = add(d2, d4)
95: d1 = add(d1, d4)
96: d0 = add(d0, d3)
97: d0, d1, d2, k0 = klt(d2, d1, d0)
98: p0 = pack(d0, g0, r0, w0, d1, d2, k0)
99: send(p0, 4)
```

Output program 1:

```
 0: p0 = recv(6, 0)
 1: d3, g2 = unpack(p0)
 2: x1 = 128
 3: x0 = 4
 4: w0 = 256
 5: d5 = gain(d3, x1)
 6: d0 = gain(d3, x0)
 7: p0 = recv(7, 0)
 8: d1, g0 = unpack(p0)
 9: x2 = 127
10: x3 = -11
11: d6 = gain(d1, x1)
12: d11 = gain(d1, x2)
13: d10 = gain(d1, x3)
14: d4 = add(d5, d6)
15: d5 = add(d5, d11)
16: d0 = add(d0, d10)
17: p0 = recv(8, 0)
18: d2, g1 = unpack(p0)
```

```
Output program 1:

19: g3 = add(g1, d2, g3, d4)
20: x3 = 126
21: x2 = 20
22: d9 = gain(d2, x1)
23: d8 = gain(d2, x3)
24: d7 = gain(d2, x2)
25: d4 = add(d4, d9)
26: d5 = add(d5, d8)
27: d0 = add(d0, d7)
28: r0 = 0
29: d0, d5, d4, k0 = klt(d4, d5, d0)
30: p0 = pack(d0, g3, r0, w0, d5, d4, k0)
31: send(p0, 5)
32: p0 = recv(5, 0)
33: d0, g3 = unpack(p0)
34: d5 = gain(d0, x1)
35: d4 = gain(d0, x0)
36: d6 = add(d5, d6)
37: d5 = add(d5, d11)
38: d4 = add(d4, d10)
39: g4 = add(g1, d2, g4, d6)
40: d6 = add(d6, d9)
41: d5 = add(d5, d8)
42: d4 = add(d4, d7)
43: d4, d5, d6, k0 = klt(d6, d5, d4)
44: p0 = pack(d4, g4, r0, w0, d5, d6, k0)
45: send(p0, 6)
46: d0 = gain(d0, g3)
47: d3 = gain(d3, g2)
48: d0 = add(d0, d3)
49: d2 = gain(d2, g1)
50: d2 = add(d0, d2)
51: p0 = pack(d2)
52: send(p0, 7)
53: d1 = gain(d1, g0)
54: d0 = add(d0, d1)
55: p0 = pack(d0)
56: send(p0, 8)
```

2.3 Iterative Optimization

Turning to the second approach that the pre-processor 104 may adopt in order to derive the run list, reference is made to established terminology in the field of mathematical optimization (including cost function/objective function/target function, inequality constraint, equality constraint, optimal value, optimal input arguments) and generic computer-implemented methods for finding numerical solutions to optimization problems. In example embodiments within this approach, to define the optimization problem underlying the optimization process, one may utilize a cost function of the form $$f(A,R) = \alpha 1 \times f1(A,R) + \alpha 2 \times f2(A,R) + \ldots,$$

where the symbols have the following meaning
$\alpha 1, \alpha 2, \ldots$ weighting coefficients;
f1 penalty on use of the processor (e.g., number of clock cycles required to execute the run list);
f2 penalty on use of the memory (e.g., maximum number of simultaneous memory spaces occupied);
f3 penalty on use of downstream bandwidth (e.g., total transmission bit rate required to transmit the outgoing bitstreams);
f4 penalty on a deviation from the required composition of one of the outgoing bitstreams (e.g., omitting a desired contribution from an incoming bitstream, or ignoring a condition on no side tone) required by the mixing strategy M;
f5 penalty on a deviation from the required format of one of the outgoing bitstreams (e.g., including a smaller set of layers in a family of layered formats) required by the mixing strategy M;
A determined momentary activity in the incoming bitstreams, possibly their formats as well;
R properties of the run list.

Using the terminology introduced in previous sections, one may consider that the information in the determined activity A and the mixing strategy M as it translates to f4 and f5 jointly define the mixing configuration in each specific run of the optimization process.

The cost function may be easily tuned, also after the design phase, to meet the requests in a specific implementation. For instance, if deviations from the required format are considered less serious than deviations from the required composition, this may be reflected by setting the coefficients $\alpha 5 < \alpha 4$. The ideas of cost function are presented here to set out logical extensions to the optimization process as reasonably foreseeable given the general formulation. In the suggested embodiments, some influence from other resources, such as the network, may be considered when performing the run list or raw computational resource optimization.

The optimization problem underlying the pre-processor's 104 derivation of the run list may also include one or more constraints, such as an upper limit on the processor use (e.g., a maximum number of processor clock cycles per unit time, chosen to ensure that real-time operation can be sustained), an upper limit on the memory use (e.g., not exceeding the capacity of the memory 102), as well as an upper limit on the bandwidth, which may be set a priori or updated dynamically during operation based on network monitoring. One or more constraints of this type may force the pre-processor 104 to derive a run list that achieves a best-effort version of the mixing strategy M. In implementations where only a complete achievement of the mixing strategy M can be accepted, it is possible to impose a constraint to the effect that the optimization problem must not return a solution deviating from the mixing strategy's required composition of the outgoing bitstreams and/or their required format. This type of constraint may not be compatible with upper bounds on processor use and the like.

An optimization problem defined along these lines are then provided to an optimization solver configured to find the minimum of the cost function by varying the run list R on which the cost function f depends, or trying a plurality of prototype run lists. For example, the solver may consider a sequence of candidate run lists iteratively, by deriving a subsequent iterate of the run list by acting deterministically on the current iterate in a manner expected to reduce or at least not increase the value of the cost function; stochastically, by varying selected properties of a current candidate run list or of a portion thereof without knowing how this will affect the cost function value; or by searching for an optimal run list by a genetic-type algorithm. The run list is obtained as the optimal argument of the optimization problem. Alternatively, the candidate run lists have been represented in an internal representation format and are compiled into a format executable by the processor 103 as a final step.

In an example embodiment, the cost function contains a term penalizing transcoding errors, fidelity loss in connection with certain transcoding, headroom and noise floor changes due to differences in mixing order. This may favour run lists with fewer pack/unpack pairs and/or fewer format conversions.

In an example embodiment, the conferencing server 100 is connectable or connected to at least one conferencing endpoint with processing capabilities, e.g., a conferencing endpoint 200 of the type shown in FIG. 2, to which one or more operations can be delegated.

One can treat the task of splitting the computational load of mixing between the conferencing server and endpoint(s) by including into the above cost function f a cost term f6 corresponding to the added load on the endpoint(s). The decision to typically will certainly also influence the required downstream bandwidth, as captured by term f3. Alternatively, the endpoint cost term f6 is set to zero—which means the optimization will tend to a run list that is optimal from the point of view of the server but not necessarily of the system as a whole—and the decision to delegate a task will only increase the bandwidth cost term f3.

The run list may be generated in two steps:
1. Start with the assumption that all mixing will be done on the server.
2. As part of the optimization, discover that it is less costly to remove some of the instructions from the server's run list and insert them into a program fragment which is sent down to the endpoint for interpretation, along with any intermediate values the endpoint needs to perform the delegated mixing operations.

At one extreme, this approach results in forwarding all the input streams through to the endpoint and having the endpoint perform all the mixing and rendering. At the other extreme, this approach results in the server rendering a final headphone or speaker audio output and sending the unencoded audio over the downstream wire. A more usual case, which lies in between these two extremes, would be that all mixing would be done on the server and a final mixed sound field would be re-encoded and sent from the server to the endpoint with the endpoint handling decoding and rendering of the sound field for headphones or speakers. The endpoint/server split could be in multiple different places too. For example, some of the streams could be mixed together on the server and the mix sent along with some further streams that the endpoint must mix into it before final rendering.

2.4 Automatic Code Generation

The third approach to the problem of deriving the run list is automatic code generation. The code generation may be based on a declarative specification expressing the mixing configuration to be implemented, that is, the mixing strategy M on the one hand and information relating to the count and formats of the active incoming bitstreams on the other. In an example already quoted, a system with n connected conferencing endpoints may be associated with a mixing strategy stipulating that all active incoming bitstreams are to be mixed and fed to all endpoints; the mixing strategy may at a given point in time, where m<n bitstreams are active, map to a mixing configuration where m active bitstreams are mixed together and supplied to all n endpoints. This concrete realization of the mixing strategy at the given point in time may further contain a specification of the actual formats of the active bitstreams and the required format(s) of the outgoing bitstream(s).

The pre-processor 104 may receive the mixing strategy M alone and supplement it of its own motion with the activity and format information, so as to obtain the specification the mixing configuration to be implemented. Alternatively, the pre-processor 104 may receive a declarative specification of the mixing configuration from other components of the conferencing server 100. The declarative specification may have a parsed structure, such as a hierarchic or tree-like structure, or may be expressed in a formalism lending itself to efficient parsing. It is possible in principle to supply the mixing configuration in terms of machine-specific target code, to parse this into an intermediate representation and based on this automatically to generate the run list in terms of target code.

Another suitable format of the mixing configuration is a data structure identifying the incoming bitstreams (and optionally, their formats) which are to contribute to the outgoing bitstreams (and optionally, their formats). The code may then be automatically generated by representing the actual initial state (incoming bitstreams which are to contribute to the outgoing bitstreams) and the desired final state (outgoing bitstreams) in a suitable state space, and a path-finding algorithm may be applied to find an advantageous path connecting these points.

The state variables defining the state space may include the content and format of each available memory space, so that the collection of primitives may correspond to permitted moves between discrete points in the state space. The sequence of moves forming a path that connects the initial and final states will correspond directly to the sought-for run list.

A variety of path-finding algorithms are known in the art, including many from the field of dynamic programming, such as Dijkstra's shortest route algorithm, the A-Star algorithm (A*) and the Bellman-Moore algorithm.

As input to the path-finding problem, one may define a cost function with the same general structure as described above, in particular with one or more of the contributions f1, f2 and f3. The cost function could include dependencies on the specifics of later stages; for example, the computational load may depend on which streams are processed and forwarded within a given server and thus a feedback may exist between successive stages.

It is not essential that the path-finding algorithm be allowed time to find one of the strictly optimal paths between the initial and final states, which would place a relatively large load on the pre-processor 104 and a relatively small load on the processor 103 and memory 102. In implementations where processing and storage resources are not known or are not expected to be scarce, the path-finding algorithm may be terminated as soon as it has found any connecting path (as A* does) or a connecting path for which the cost is below a predefined upper bound, regardless of the true minimum. An upper bound of this type (e.g., maximum number of processor clock cycles, maximum memory use, maximum downstream bandwidth) may also be defined in other situations, for example, to get an early warning that the processor 103 may not be able to execute the entire run list in the time available.

Further options may be found in section 3 of the Master's thesis Böhm, "Automatic code generation using dynamic programming techniques", Universität Linz (2007), which gives an overview of several other techniques for automatic code generation according by dynamic programming. Many of these teachings can be implemented in a pre-processor 104 according to embodiments of the present invention to generate the run list, either by a straightforward application or after routine adaptation within the abilities of one of normal skill in the art. The Böhm thesis is included by reference, as are the relevant bibliography references cited in section 3 thereof, including: Aho, Ganapathi and Tjiang, *ACM Transactions on Programming Languages and Systems*, vol. 11 (1989), pp. 491-516; Fraser and Hanson, *ACM Letters on Programming Languages and Systems*, vol. 1

(1992), pp. 213-226; Fraser and Proebsting, *Proceedings of the ACM SIGPLAN conference on Programming language design and implementation* (1999), pp. 270-280; Glanville and Graham, *Proceedings of the 5th ACM SIGACT-SIGPLAN symposium on Principles of programming languages* (1978), pp. 231-254; Horspool and Scheunemann, *Software—Practice and Experience*, vol. 15 (1985), pp. 503-514; Proebsting, *Proceedings of the ACM SIGPLAN conference on Programming language design and implementation* (1992), pp. 331-340; Proebsting, *ACM Transactions on Programming Languages and Systems*, vol. 17 (1995), pp. 461-486; Proebsting and Whaley, *Proceedings of the 6th International Conference on Compiler Construction* (1996), pp. 294-308.

3. Equivalents, Extensions, Alternatives and Miscellaneous

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A conferencing server, comprising:
an interface for receiving a plurality of incoming bitstreams from respective conferencing endpoints and supplying at least one outgoing bitstream to the conferencing endpoints, wherein said incoming and outgoing bitstreams comprise media data, including at least one of: audio data, video data, audiovisual data and screen-sharing data;
a memory with a plurality of memory spaces;
a processor operable to perform operations selected from a predefined collection of primitives, wherein said predefined collection of primitives is suitable to implement a plurality of mixing strategies, and wherein each operation inputs media data from one or more of said memory spaces and/or outputs media data to one or more of said memory spaces; and
a pre-processor adapted to receive a mixing strategy specifying a desired content of the at least one outgoing bitstream in relation to generic incoming bitstreams that are unknown as to their number and/or format and/or activity and requiring at least one additive media mixing step, and repeatedly derive a run list of operations selected from said predefined collection of primitives that realizes the received mixing strategy for the received incoming bitstreams, wherein the pre-processor is adapted to derive the run list dynamically while taking into consideration momentary activity in each received incoming bitstream,
wherein the processor is configured to execute said run list for thereby supplying the at least one outgoing bitstream on the basis of said plurality of received incoming bitstreams.

2. The conferencing server of claim 1, wherein the media data includes audio data and the momentary activity in each received incoming bitstream includes momentary audio activity, in particular momentary voice activity.

3. The conferencing server of claim 2, further configured to update said momentary audio activity in the received incoming bitstreams at least every second, preferably at least 10 times per second, more preferably at least 25 times per second, wherein the pre-processor derives a run list for each update.

4. The conferencing server of claim 1, wherein:
the pre-processor is adapted to repeatedly run an optimization process, which tends to minimize a cost function and outputs a run list of operations from said predefined collection of primitives;
the cost function penalizes deviations from the received mixing strategy and further penalizes at least one of the following: use of the processor, use of the memory, use of total bandwidth for supplying the at least one outgoing bitstream; and
the optimization process takes into consideration the momentary activity in each received incoming bitstream.

5. The conferencing server of claim 4, wherein the received mixing strategy is an absolute condition in the optimization process.

6. The conferencing server of claim 4, wherein:
the optimization process is subject to a constraint on at least one of: use of the processor, use of the memory, use of total bandwidth for supplying the at least one outgoing bitstream; and
the optimization process is configured to return a run list realizing a best-effort version of the received mixing strategy and satisfying said constraint.

7. The conferencing server of claim 1, wherein the predefined collection of primitives includes at least one of the following:
associating audio data with a gain;
changing an existing gain associated with audio data;

packing media data stored in a memory space to allow it to be transmitted as a bitstream;

unpacking media data received as a bitstream and storing it in a memory space;

transforming audio data between the frequency domain and time domain;

additively mixing frequency-domain audio data, in particular KLT-compressed audio data;

additively mixing time-domain audio data;

changing a media data format, including an audio channel configuration and/or a metadata configuration.

8. The conferencing server of claim 7, configured to process audio data with any format within a family of layered audio formats, wherein the predefined collection of primitives includes converting between audio formats in said family.

9. The conferencing server of claim 8, wherein the family of layered audio formats includes at least one format with sound field audio data and associated gain metadata.

10. The conferencing server of claim 9, wherein the predefined collection of primitives includes at least one the following operations:

changing the gain metadata;

changing a geometric property of the sound field.

11. A method in a conferencing server for supplying at least one outgoing bitstream on the basis of a plurality of received incoming bitstreams, the method comprising:

receiving a plurality of incoming bitstreams from respective conferencing endpoints, wherein said received incoming bitstreams comprise media data, including at least one of: audio data, video data, audiovisual data and screen-sharing data;

receiving a mixing strategy specifying a desired content of the at least one outgoing bitstream in relation to generic incoming bitstreams that are unknown as to their number and/or format and/or activity, and requiring at least one additive media mixing step; and supplying the at least one outgoing bitstream on the basis of said plurality of received incoming bitstreams by executing, in a processor and a memory (102) with a plurality of memory spaces, a run list of operations selected from a predefined collection of primitives and realizing the received mixing strategy for the received incoming bitstreams, wherein said predefined collection of primitives is suitable to implement a plurality of mixing strategies, and wherein each operation inputs media data from one or more of said memory spaces and/or outputs media data to one or more of said memory spaces;

determining momentary activity in each received incoming bitstream; and deriving said run list repeatedly and dynamically while taking into consideration the determined momentary activity.

12. The method of claim 11, wherein the media data includes audio data and the momentary activity in each received incoming bitstream includes momentary audio activity, in particular momentary voice activity.

13. The method of claim 12, wherein:

the momentary audio activity in the received incoming bitstreams is re-determined at least every second, preferably at least 10 times per second, more preferably at least 25 times per second; and for each new value of the momentary audio activity, said run list is updated and executed, in the place of the previous run list, to supply the at least one outgoing bitstream.

14. The method of claim 11, wherein:

said run list is derived by repeatedly running an optimization process tending to minimize a cost function and having as output a run list of operations from said predefined collection of primitives;

the cost function penalizes deviations from the received mixing strategy and further penalizes at least one of the following: use of the processor, use of the memory, use of total bandwidth for supplying the at least one outgoing bitstream; and the optimization process takes into consideration the momentary activity in each received incoming bitstream.

15. The method of claim 14, wherein the received mixing strategy is an absolute condition in the optimization process.

16. The method of claim 11, wherein:

the optimization process is subject to a constraint on at least one of: use of the processor, use of the memory, use of total bandwidth for supplying the at least one outgoing bitstream; and the optimization process is configured to return a run list realizing a best-effort version of the received mixing strategy and satisfying said constraint.

17. The method of claim 11, wherein the predefined collection of primitives includes at least one of the following:

associating audio data with a gain;

changing an existing gain associated with audio data;

packing media data stored in a memory space to allow it to be transmitted as a bitstream;

unpacking media data received as a bitstream and storing it in a memory space;

transforming audio data between the frequency domain and time domain;

additively mixing frequency-domain audio data, in particular KLT-compressed audio data;

additively mixing time-domain audio data; and changing a media data format, including an audio channel configuration and/or a metadata configuration.

18. The method of claim 17, wherein the predefined collection of primitives includes converting between audio formats in a family of layered audio formats and processing audio data with any format in said family.

19. The method of claim 18, wherein the family of layered audio formats includes at least one format with sound field audio data and associated gain metadata.

20. A computer program product comprising a data carrier with computer-executable instructions for causing a programmable computer to perform the method of claim 11.

* * * * *